United States Patent
Hegler et al.

(10) Patent No.: US 11,185,911 B1
(45) Date of Patent: Nov. 30, 2021

(54) SWAGE MACHINE MODULAR GRAB ADAPTER SYSTEMS AND METHODS

(71) Applicant: Trinity Bay Equipment Holdings, LLC, Houston, TX (US)

(72) Inventors: Matthew Allen Hegler, Kingwood, TX (US); John Paul Leger, Baytown, TX (US); Jagtar Singh Thethy, Cypress, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/193,031

(22) Filed: Mar. 5, 2021

(51) Int. Cl.
| | |
|---|---|
| *B21D 39/04* | (2006.01) |
| *B21D 37/12* | (2006.01) |
| *B21J 15/02* | (2006.01) |
| *F16L 13/14* | (2006.01) |
| *B21J 13/02* | (2006.01) |
| *B21D 37/10* | (2006.01) |
| *B23P 19/02* | (2006.01) |
| *B21D 39/06* | (2006.01) |
| *B23P 19/04* | (2006.01) |
| *B21D 37/06* | (2006.01) |
| *B21D 41/04* | (2006.01) |

(52) U.S. Cl.
CPC ............ *B21J 15/022* (2013.01); *B21D 37/12* (2013.01); *B21D 39/046* (2013.01); *B21J 13/02* (2013.01); *F16L 13/146* (2013.01); *B21D 37/06* (2013.01); *B21D 37/10* (2013.01); *B21D 39/048* (2013.01); *B21D 39/06* (2013.01); *B21D 41/04* (2013.01); *B23P 19/02* (2013.01); *B23P 19/04* (2013.01); *Y10T 29/49904* (2015.01)

(58) Field of Classification Search
CPC ........ B21D 37/06; B21D 37/10; B21D 37/12; B21D 39/046; B21D 39/048; B21D 39/06; B21D 41/04; B23P 19/02; B23P 19/04; Y10T 29/49904
USPC .......................................... 72/470, 471, 472
See application file for complete search history.

(56) References Cited

U.S. PATENT DOCUMENTS

| | | | | |
|---|---|---|---|---|
| 6,840,433 | B2 * | 1/2005 | Vermaat | B23K 37/0533 228/212 |
| 8,336,177 | B2 * | 12/2012 | Vernasca | F04B 17/00 29/237 |
| 8,904,848 | B2 * | 12/2014 | Frenken | B21D 39/048 72/416 |

(Continued)

*Primary Examiner* — Jermie E Cozart
(74) *Attorney, Agent, or Firm* — Conrad J. Hsu

(57) ABSTRACT

Techniques for implementing and/or deploying a swage machine, which includes a die plate that enables a die to be used to conformally deform a pipe fitting around pipe segment tubing to be loaded in the swage machine, a grab plate having grab plate sections that are pivotably connected, and grab adapter sections. Each grab adapter sections includes a base sub-section connected to a corresponding grab plate section, in which an inner surface of the base sub-section includes an alignment notch, and a modular sub-section to be secured to the base sub-section, in which an outer surface of the modular sub-section includes an alignment tab to be disposed within the alignment notch in the base sub-section and an inner surface of the modular sub-section includes a grab tab section that matingly interlocks with a fitting grab notch on the pipe fitting to facilitate securing the swage machine to the pipe fitting.

10 Claims, 11 Drawing Sheets

(56) References Cited

U.S. PATENT DOCUMENTS

| | | | | |
|---|---|---|---|---|
| 9,015,916 B2* | 4/2015 | Frenken | ............... | F16L 13/141 29/237 |
| 2010/0229368 A1* | 9/2010 | Frenken | ............... | B25B 27/10 29/516 |
| 2013/0025101 A1* | 1/2013 | Pfeiffer | ............... | B25B 27/10 29/237 |
| 2014/0259597 A1* | 9/2014 | Lavalley | ............... | F16L 1/036 29/407.1 |

* cited by examiner

SWAGE MACHINE MODULAR GRAB ADAPTER SYSTEMS AND METHODS

BACKGROUND

The present disclosure generally relates to pipeline systems and, more particularly, to a swage machine that may implemented and/or operated to facilitate securing a pipe fitting to a pipe segment in a pipeline system.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate fluid transportation, a pipeline system generally includes one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

Additionally, in some instances, a pipe fitting may be secured to a pipe segment using special-purpose deployment equipment—namely a swage machine, which is implemented and/or operated to conformally deform at least a portion of the pipe fitting around the tubing of the pipe segment such that the portion of the pipe fitting engages the pipe segment tubing. Generally, a swage machine may include a grab plate, which is to be secured to a grab notch on a pipe fitting, a die plate, which enables a set of die segments to be loaded in the swage machine, and one or more swaging actuators, which selectively move the die plate over the pipe fitting in an axial direction to swage the pipe fitting. However, grab notches on different pipe fittings may have different geometries, which, at least in some instances, may limit the ability of the same swage machine to be used to swage different pipe fittings and, thus, pipeline deployment efficiency.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a swage machine includes a die plate that enables a die that is to be used to conformally deform a portion of a pipe fitting around pipe segment tubing to be loaded in the swage machine, a grab plate having grab plate sections that are pivotably connected via hinges, and grab adapter sections. Each of the grab adapter sections includes a base sub-section connected to a corresponding grab plate section, in which an inner surface of the base sub-section includes an alignment notch, and a modular sub-section to be secured to the base sub-section, in which an outer surface of the modular sub-section includes an alignment tab to be disposed within the alignment notch in the base sub-section and an inner surface of the modular sub-section includes a grab tab section that matingly interlocks with a fitting grab notch on the pipe fitting to facilitate securing the swage machine to the pipe fitting.

In another embodiment, a method of deploying a swage machine includes maintaining the swage machine in an opened state at least in part by maintaining a first plate section of a grab plate in the swage machine pivoted away from a second plate section of the grab plate and securing a grab adapter section to the first plate section of the grab plate while the swage machine is in the opened state to facilitate securing the swage machine to a pipe fitting. Securing the grab adapter section to the first plate section of the grab plate includes securing a first modular sub-section that has a first grab tab section on a first inner surface to the first plate section of the grab plate at least in part by disposing a modular alignment tab on an outer surface of the first modular sub-section within a base alignment notch on an inner surface of a base sub-section in the grab adapter section in response to determining that a fitting grab notch on the pipe fitting has a first geometry that corresponds with the first grab tab section and securing a second modular sub-section that has a second grab tab section on a second inner surface to the first plate section of the grab plate in response to determining that the fitting grab notch on the pipe fitting has a second geometry that corresponds with the second grab tab section.

In another embodiment, a grab adapter to be deployed in a swage machine includes grab adapter sections. Each of the grab adapter sections includes a base sub-section to be secured to a grab plate section in the swage machine, in which the base sub-section includes a base alignment notch on an inner surface, a first modular sub-section to be secured to the base sub-section when the swage machine is to be used to swage a first pipe fitting that has a first grab notch geometry, in which the first modular sub-section includes a first grab tab section on a first inner surface that matingly interlocks with the first grab notch geometry and a modular alignment tab on an outer surface that is to be disposed within the base alignment notch in the base sub-section; and a second modular sub-section to be secured to the base sub-section when the swage machine is to be used to swage a second pipe fitting that has a second grab notch geometry, in which the second modular sub-section includes a second grab tab section on a second inner surface that matingly interlocks with the second grab notch geometry.

DETAILED DESCRIPTION

Figure 1:
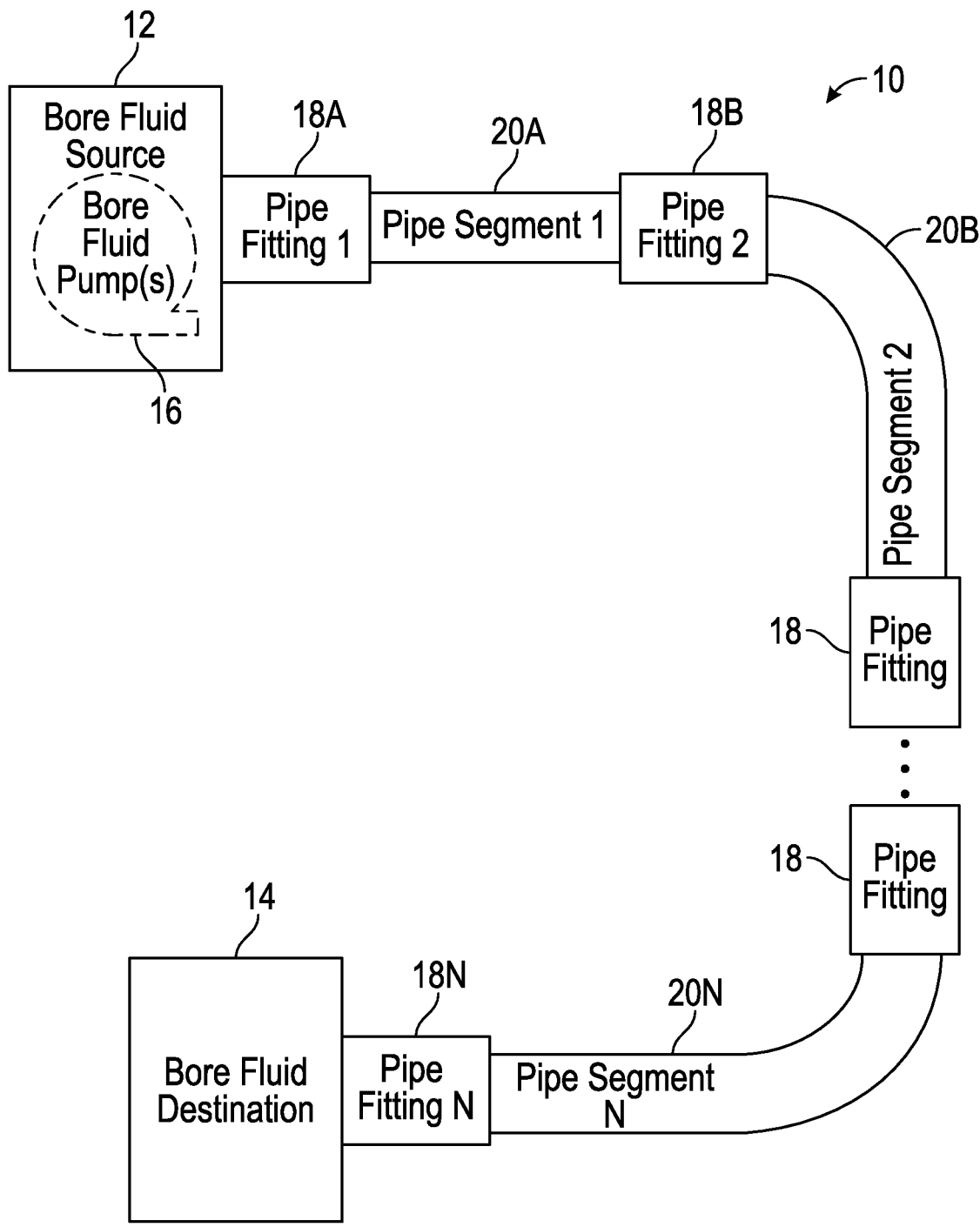
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure relates to pipeline systems, which generally include pipe segments secured and sealed in pipe fittings, such as a midline pipe fitting and/or a pipe end fitting. In some instances, a pipe segment may be secured and sealed in a pipe fitting via special-purpose deployment equipment—namely a swage machine, which conformally deforms a fitting jacket of the pipe fitting around tubing of the pipe segment such that the inner surface of the fitting jacket engages the outer surface of the pipe segment tubing.

To swage a pipe fitting using a swage machine, a grab plate of the swage machine may be secured to the pipe fitting via a grab adapter at least in part by securing the grab adapter to the grab plate and interlocking a grab tab on the grab adapter with a grab notch on the pipe fitting.

To enable a swage machine to accommodate pipe fittings that have different grab notch geometries (e.g., size, shape, and/or diameter), the present disclosure provides techniques for implementing and/or deploying a modular grab adapter in a swage machine. As will be described in more detail below, a section of a modular grab adapter that is secured to a grab plate section in a swage machine may generally include a base sub-section and one or more modular sub-sections. In particular, the grab adapter base sub-section may be secured to or integrated with the grab plate section and include a base alignment notch on its inner surface while a grab adapter modular sub-section may include a grab tab section on its inner surface and a modular alignment tab (e.g., protrusion), which may be disposed within the base alignment notch to facilitate securing the grab adapter modular sub-section to the grab adapter base sub-section and/or transferring axial force therebetween, on its outer surface. In fact, in some embodiments, different grab adapter modular sub-sections may be swapped in to accommodate different grab notch geometries, which, at least in some instances, may improve pipeline deployment efficiency, for example, by enabling the same swage machine to be used to swage pipe fittings that have grab notches with different dimensions (e.g., diameters and/or circumferences).

An example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be included at the bore fluid source 12, for example, when fluid flow through the bore of the pipeline system 10 is produced by gravity. Additionally or alternatively, in other embodiments, one or more bore fluid pumps 16 may be included in the pipeline system 10 and/or at the bore fluid destination 14.

To facilitate transporting fluid from the bore fluid source 12 to the bore fluid destination 14, as in the depicted example, a pipeline system 10 may include pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may include multiple different layers. For example, the tubing of a pipe segment 20 may include a first high-density polyethylene (e.g., internal corrosion protection) layer, one or more intermediate (e.g., steel strip) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define free space (e.g., one or more gaps) devoid of solid material within its annulus. In fact, in some embodiments, free space defined in the tubing of a pipe segment 20 may run (e.g., span) the length of the pipe segment 20 and, thus, define (e.g., enclose) a fluid conduit (e.g., free space) in the annulus of the tubing, which is separate from the pipe bore. In other words, in such embodiments, fluid may flow through a pipe segment 20 via its pipe bore, free space (e.g., gaps and/or one or more fluid conduits) defined within its tubing annulus, or both.

Figure 2:
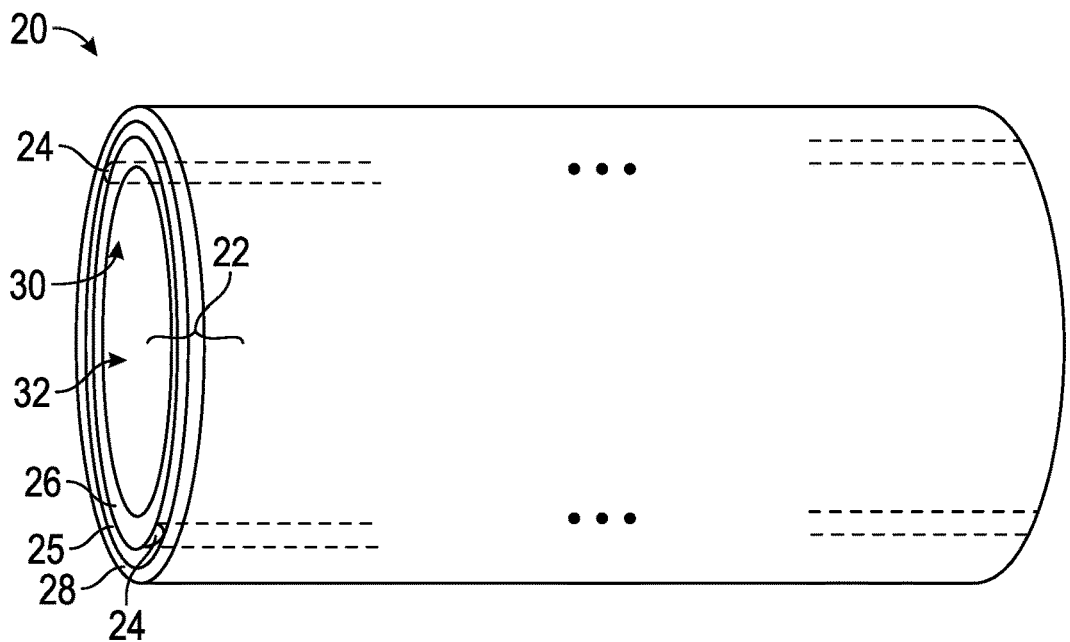
FIG. 2 is a side view of an example of a pipe segment of FIG. 1 that includes a pipe bore defined by its tubing as well as fluid conduits defined within an annulus of its tubing, in accordance with an embodiment of the present disclosure.

To help illustrate, an example of a pipe segment 20, which includes tubing 22 with fluid conduits (e.g., free space) 24 defined in its annulus 25, is shown in FIG. 2. As depicted, the pipe segment tubing 22 has multiple layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures having two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is defined between its inner barrier layer 26 and its outer barrier layer 28. As will be described in more detail below, the tubing annulus 25 may include one or more intermediate layers of the pipe segment tubing 22. Furthermore, as depicted, fluid conduits (e.g., free space and/or gaps) 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 defined in its annulus 25 may include less solid material and, thus, exert less resistance to flexure, for example, compared to solid pipe segment tubing 22 and/or pipe segment tubing 22 that does not include fluid conduits 24 defined therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more that two (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the longitudinal extent of the pipe bore 32 of the pipe segment 20.

Figure 3:
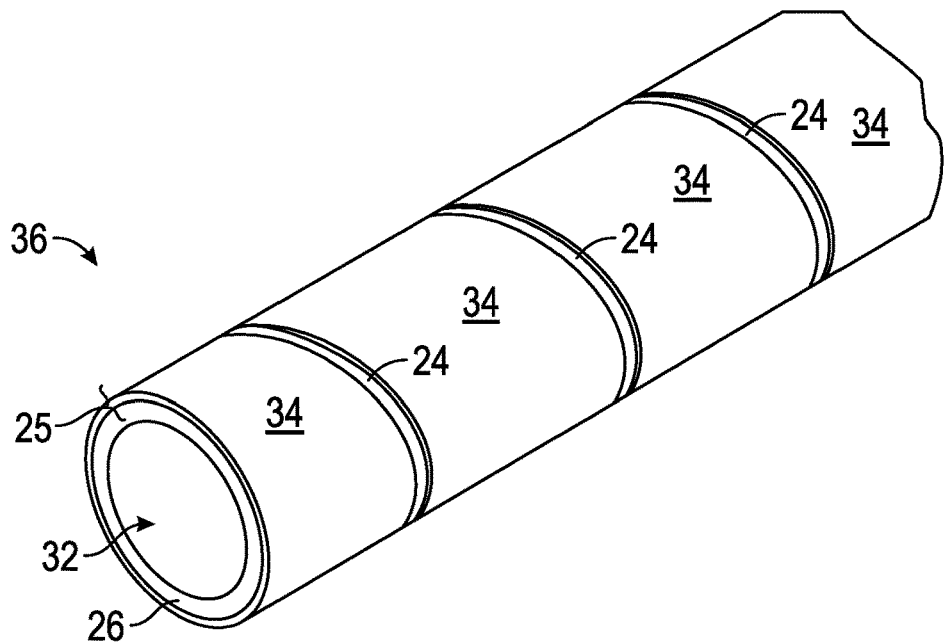
FIG. 3 is an example of a portion of the pipe segment of FIG. 2 with a helically shaped fluid conduit defined within the annulus of its tubing, in accordance with an embodiment of the present disclosure.

To help illustrate, an example of a portion 36 of a pipe segment 20, which includes an inner barrier layer 26 and an intermediate layer 34 included in the annulus 25 of its pipe segment tubing 22, is shown in FIG. 3. In some embodiments, one or more intermediate layers 34 of the pipe segment tubing 22 may be composite material and/or metal, such as carbon steel, stainless steel, duplex stainless steel, super duplex stainless steel, or any combination thereof. In other words, at least in some such embodiments, an intermediate layer 34 of the pipe segment tubing 22 may be made using electrically conductive material, which, at least in some instances, may enable communication of electrical (e.g., sensor and/or control) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle (e.g., fifty-two degrees) relative to the longitudinal extent of the pipe bore 32. In any case, as depicted, the resulting fluid conduit 24 runs helically along the pipe segment 20, for example, such that the fluid conduit 24 is skewed fifty-two degrees relative to the longitudinal extent of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of a pipe segment 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding fluid conduits 24 in the tubing annulus 25 of the pipe segment 20.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, to facilitate flowing fluid from a bore fluid source 12 to a bore fluid destination 14, as described above, one or more pipe fittings 18, such as a midline pipe fitting 18 and/or a pipe end fitting 18, may be secured to a pipe segment 20. In particular, as described above, in some instances, a pipe fitting 18 may be secured to a pipe segment 20 using swaging techniques, which conformally deform a fitting jacket of the pipe fitting 18 around tubing 22 of the pipe segment 20. In fact, in some embodiments, special-purpose deployment equipment—namely a swage machine—may be implemented and/or operated to facilitate securing a pipe fitting 18 to a pipe segment 20 during deployment of a pipeline system 10.

Figure 4:
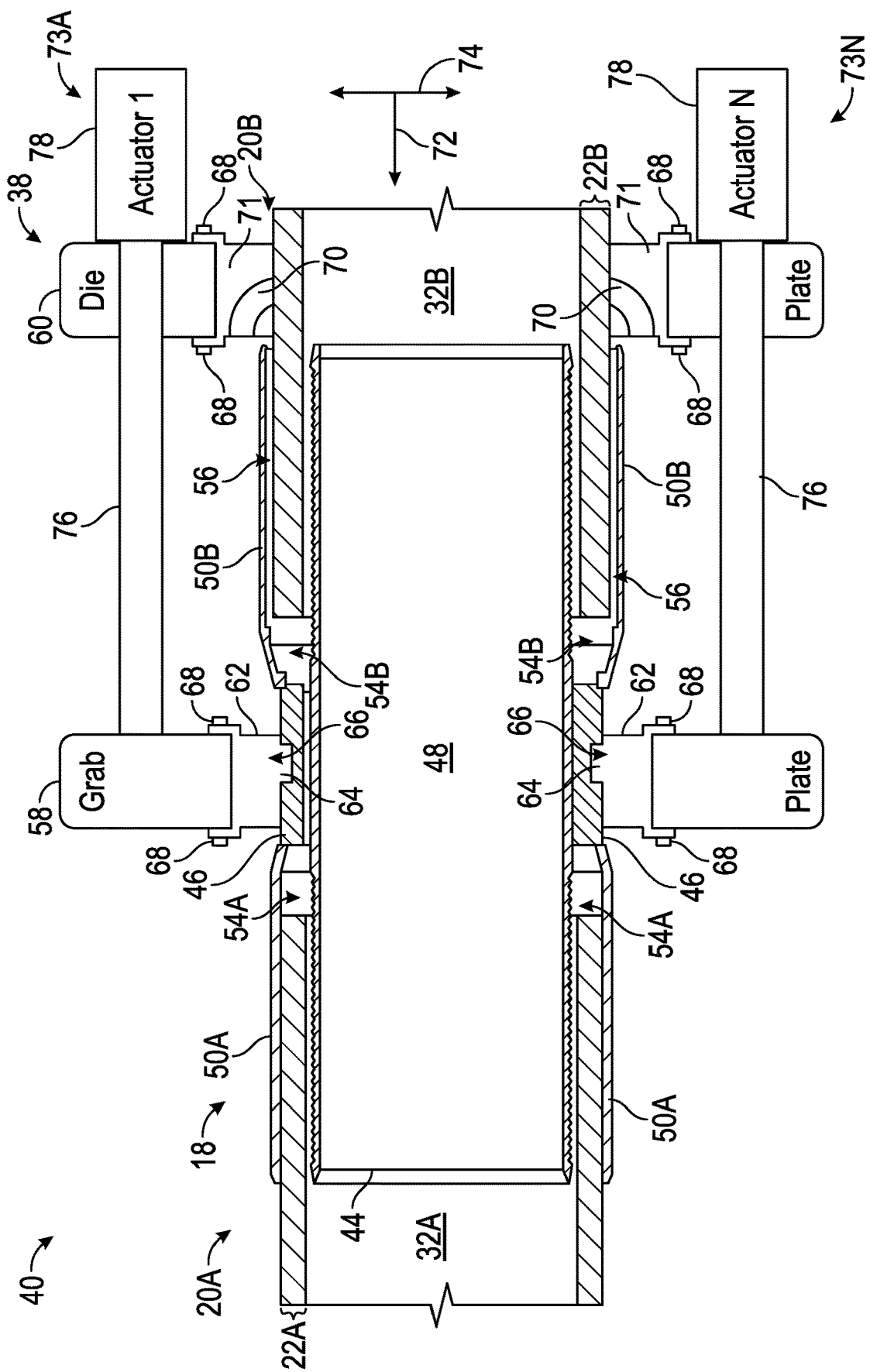
FIG. 4 is a cross-sectional view of an example of a swage machine secured to a portion of a pipeline system, in accordance with an embodiment of the present disclosure.

To help illustrate, an example cross-section of a swage machine 38 and a portion 40 of a pipeline system 10 is shown in FIG. 4. As depicted, the portion 40 of the pipeline system 10 includes a first pipe segment 20A, a second pipe segment 20B, and a pipe fitting 18, which is disposed between the first pipe segment 20A and the second pipe segment 20B. Additionally, the pipe fitting 18 includes a fitting tube 44 and a grab ring 46, which is disposed around (e.g., surrounding) the fitting tube 44. In particular, the fitting tube 44 defines (e.g., encloses) a fitting bore 48, which is fluidly coupled to a first pipe bore 32A of the first pipe segment 20A and a second pipe bore 32B of the second pipe segment 20B.

In other words, the pipe fitting 18 in FIG. 4 may be a midline pipe fitting 18. However, it should be appreciated that the depicted example is merely intended to be illustrative and not limiting. In particular, in other embodiments, the techniques described in the present disclosure may additionally or alternatively be used with other types of pipe fittings 18, such as a pipe end fitting 18.

In any case, as depicted, the pipe fitting 18 includes fitting jackets 50—namely a first fitting jacket 50A and a second fitting jacket 50B—secured (e.g., welded) to the grab ring 46 such that they extend circumferentially around the fitting tube 44. Additionally, first tubing 22A of the first pipe segment 20A is disposed within a first tubing cavity 54A of the pipe fitting 18, which is defined between the first fitting jacket 50A and the fitting tube 44. Similarly, second tubing 22B of the second pipe segment 20B is disposed within a second tubing cavity 54B of the pipe fitting 18, which is defined between the second fitting jacket 50B and the fitting tube 44.

However, as depicted, open space 56 is present between the second tubing 22B of the second pipe segment 20B and the second fitting jacket 50B of the pipe fitting 18 whereas minimal open space is present between the first tubing 22A of the first pipe segment 20A and the first fitting jacket 50A of the pipe fitting 18. As such, the pipe fitting 18 may exert more resistance to tubing movement in the first tubing cavity 54A and, thus, facilitate securing the pipe fitting 18 to the first pipe segment 20A. On the other hand, the pipe fitting 18 may exert less resistance to tubing movement in the second tubing cavity 54B, which, at least in some instances, may enable the second tubing 22B of the second pipe segment 20B to move relatively freely into and/or out from the second tubing cavity 54B of the pipe fitting 18. As such, to facilitate securing the pipe fitting 18 to the second pipe segment 20B, the swage machine 38 may be operated to conformally deform (e.g., swage) the second fitting jacket 50B around the second tubing 22B of the second pipe segment 20B such that the inner surface of the second fitting jacket 50B engages the outer surface of the second pipe segment tubing 22B, thereby consuming at least a portion (e.g., majority) of the open space 56.

To facilitate conformally deforming a fitting jacket 50 of a pipe fitting 18 around pipe segment tubing 22, as in the depicted example, a swage machine 38 generally includes a grab plate 58 and a die plate 60. In particular, to facilitate securing the swage machine 38 to the pipe fitting 18, a grab adapter 62 may be secured to the grab plate 58 via one or more threaded fasteners 68, such as a bolt or a screw. The grab adapter 62 includes a grab tab 64 that is implemented (e.g., sized and/or shaped) to matingly interlock (e.g., engage and/or interface) with a fitting grab notch 66 that extends circumferentially along the outer surface of the grab ring 46 in the pipe fitting 18.

However, it should be appreciated that the depicted example is merely intended to be illustrative and not limiting. In particular, in other embodiments, a grab tab 64 and a corresponding fitting grab notch 66 may be reversed. In other words, in such embodiments, a grab ring 46 on a pipe fitting 18 may include a grab tab 64 that extends radially outward while a corresponding grab adapter 62 includes a grab notch 66, which is implemented (e.g., sized and/or shaped) to matingly interlock (e.g., engage and/or interface) with the grab tab 64 of the pipe fitting 18.

Additionally, to enable a die 70 to be loaded in the swage machine 38, a die seat 71 may be secured to the die plate 60 via one or more threaded fasteners 68, such as a bolt or a screw. In particular, in the depicted example, the die 70 is loaded into the die plate 60 such that the die 70 opens toward the grab plate 58 of the swage machine 38. As such, when compressed against a fitting jacket 50 of the pipe fitting 18 in an axial direction 72 toward the grab plate 58, the shape of the die 70 may compress the fitting jacket 50 circumferentially inward in a radial direction 74, for example, such that the fitting jacket 50 and pipe segment tubing 22 disposed in a corresponding tubing cavity 54 are conformally deformed.

To facilitate compressing a die 70 loaded in its die plate 60 against a fitting jacket 50 in an axial direction 72, as in the depicted example, a swage machine 38 may generally include one or more swaging actuators 73. In particular, the swage machine 38 may include a first swaging actuator 73A and an Nth swaging actuator 73N. In some embodiments, one or more swaging actuators 73 in a swage machine 38 may be a fluid actuator, such as a hydraulic actuator or a pneumatic actuator. In any case, as depicted, each swaging actuator 73 of the swage machine 38 includes an actuator cylinder 78 and an actuator rod (e.g., piston) 76, which selectively extends out from the actuator cylinder 78 based at least in part on the supply of fluid (e.g., liquid and/or gas) to the actuator cylinder 78 and/or selectively retracts into the actuator cylinder 78 based at least in part on the extraction of fluid from the actuator cylinder 78.

In particular, in the depicted example, the actuator cylinder 78 of each swaging actuator 73 is secured to the die plate 60 of the swage machine 38. Additionally, the actuator rod 76 of each swaging actuator 73 extends through the die plate 60 and is secured (e.g., welded or bolted) to the grab plate 58 of the swage machine 38. As such, to perform a swaging operation, one or more of swaging actuators 73 of the swage machine 38 may be operated to pull the grab plate 58 toward the die plate 60 via one or more reverse (e.g., retracting) strokes such that the second fitting jacket 50B of the pipe fitting 18 secured to the grab plate 58 moves through the die 70 loaded in the die plate 60.

However, it should be appreciated that the techniques described in the present disclosure are not limited to a specific configuration of a swage machine 38. For example, in other embodiments, a swage machine 38 may conformally deform a fitting jacket 50 around pipe segment tubing 22 by moving its die plate 60 over the fitting jacket 50 via one or more forward (e.g., extending) strokes. Additionally or alternatively, in other embodiments, a swage machine 38 may conformally deform a fitting jacket 50 around pipe segment tubing 22 by moving its die plate 60 over the fitting jacket 50 in an outward axial direction 72 away from its grab plate 58.

In any case, the ability of a swage machine 38 to swage a pipe fitting 18 may be premised on a die 70 and, thus, the die plate 60 in which the die 70 is loaded being disposed circumferentially around the pipe fitting 18. Additionally, as described above, to facilitate securing a swage machine 38 to a pipe fitting 18, a grab adapter 62 secured to the grab plate 58 of the swage machine 38 may matingly interlock with a fitting grab notch 66, which extends circumferentially along the outer surface of the pipe fitting 18. Since a pipe fitting 18 to be swaged may not necessarily be at an end of a pipeline system 10, swage machine plates (e.g., die plate 60 and/or grab plate 58) of a swage machine 38 may be implemented to enable the swage machine 38 to selectively transition between an opened state, which enables the swage machine 38 to be deployed at or removed from the pipe fitting 18, and a closed state, which enables the swage machine 38 to swage the pipe fitting 18.

Figure 5:
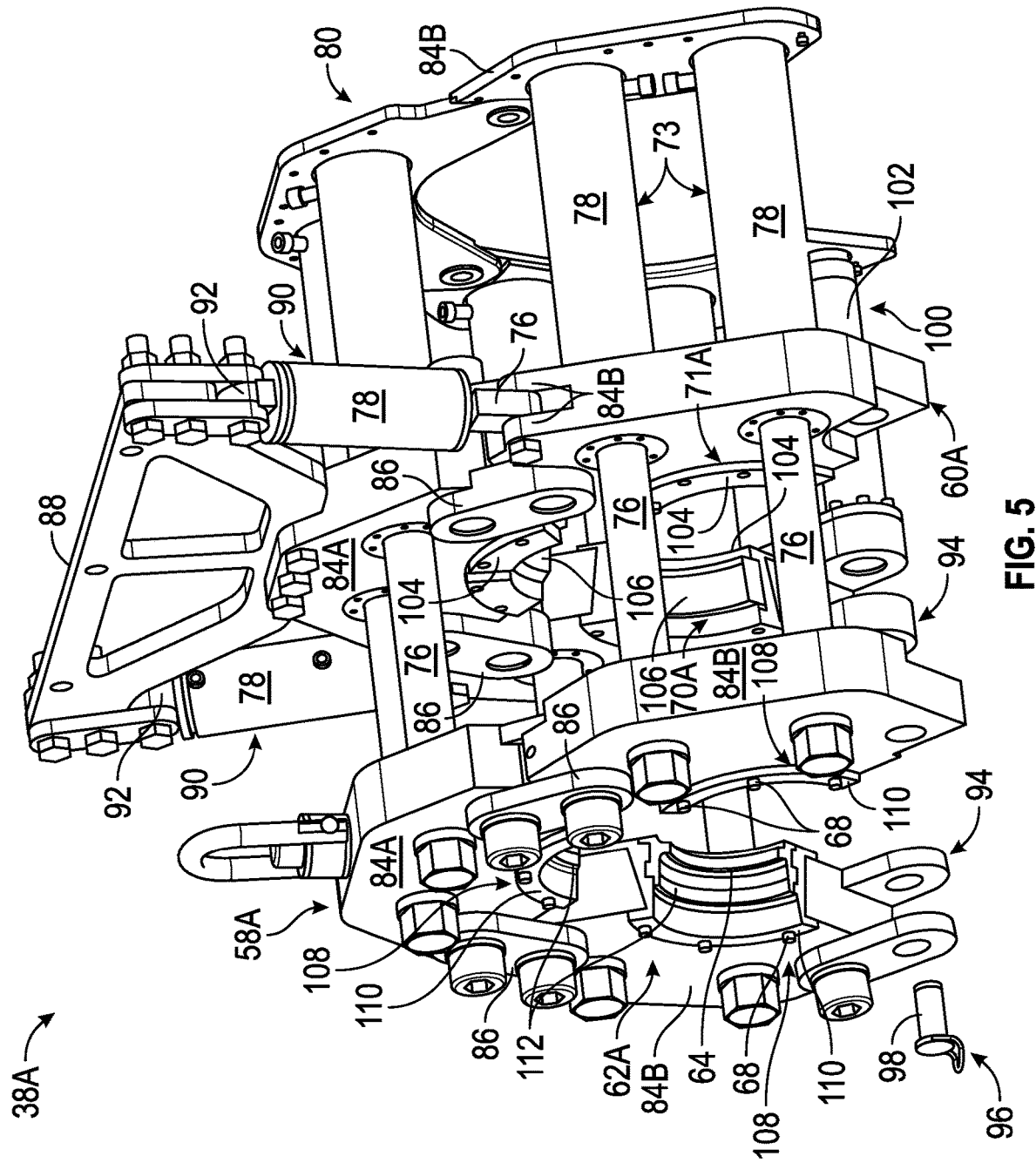
FIG. 5 is a perspective view of an example of the swage machine of FIG. 4 in an opened state, in accordance with an embodiment of the present disclosure.

To help illustrate, a more detailed example of a swage machine 38A in its opened state is shown in FIG. 5. As in the depicted example, in addition to a grab plate 58 and a die plate 60, in some embodiments, a swage machine 38 may include a support plate 80. In particular, in the depicted example, swaging actuators 73 of the swage machine 38A are each secured to the support plate 80 such that its actuator cylinder 78 is secured between the support plate 80 and the die plate 60A. As such, the support plate 80 may be facilitate supporting the swaging actuators 73 of the swage machine 38A. Moreover, at least in some instances, the actuator cylinders 78 of the swaging actuators 73 may facilitate transferring force (e.g., stress and/or load) exerted on the die plate 60A to the support plate 80.

However, it should be appreciated that the depicted example is merely intended to be illustrative and not limiting. In particular, in other embodiments, a swage machine 38 may not include a support plate 80. Additionally, in other embodiments, a swage machine 38 may additionally include a housing, which is disposed around the actuator cylinders 78 of its swaging actuators 73 and secured to its die plate 60 as well as its support plate 80. Furthermore, in other embodiments, a swage machine 38 may additionally include one or more support rods secured between its die plate 60 and its support plate 80 (e.g., to facilitate supplementing the force transfer provided by actuator cylinders 78 in the swage machine 38) and/or between the die plate 60 and its grab plate 58 (e.g., to facilitate supplementing support provided by actuator rods 76 in the swage machine 38). Moreover, in other embodiments, a swage machine 38 may include more than six (e.g., seven, eight, or more) swaging actuators 73 or less than six (e.g., five, four, or less) swaging actuators 73.

In any case, as in the depicted example, to enable a swage machine 38 to be transitioned between its opened state and its closed state, each plate (e.g., grab plate 58, die plate 60, and/or support plate 80) of the swage machine 38 may be implemented using multiple plate sections 84—namely a base plate section 84A and one or more pivotable plate sections 84B. In particular, to facilitate transitioning between the opened state and the closed state, each pivotable plate section 84B of a swage machine plate may be connected to another (e.g., base) plate section 84 via a hinge 86. Furthermore, as in the depicted example, in some embodiments, a swage machine 38 may additionally include an equipment base 88 secured to the base plate section 84A of its die plate 60, for example, to facilitate moving the swage machine 38 via a crane.

Moreover, as in the depicted example, to facilitate transitioning a swage machine 38 between its opened state and its closed state, in some embodiments, one or more base actuators 90 may each be secured between the equipment base 88 of the swage machine 38 and a corresponding pivotable plate section 84B of the swage machine 38. In particular, each base actuator 90 may be secured such that its actuator cylinder 78 is pivotably secured to the equipment base 88 and its actuator rod 76 is pivotably secured to a corresponding pivotable plate section 84B of a die plate 60.

Accordingly, in the depicted example, operating a base actuator 90 to retract its actuator rod 76 into its actuator cylinder 78 may cause a corresponding pivotable plate section 84B of the die plate 60A to rotate (e.g., pivot) toward its securement point 92 on the equipment base 88. In other words, since the pivotable plate sections 84 of the die plate 60A are connected to the pivotable plate sections 84 of the grab plate 58A via the actuator rods 76 of the swaging actuators 73 and to the pivotable plate sections 84 of the support plate 80 via the actuator cylinders 78 of the swaging actuators 73, operating the base actuator 90 to retract its actuator rod 76 into its actuator cylinder 78 may facilitate transitioning the swage machine 38A from its closed state toward its opened state.

On the other hand, operating a base actuator 90 to extend its actuator rod 76 out from its actuator cylinder 78 may cause a corresponding pivotable plate section 84B of the die plate 60A to rotate (e.g., pivot) away from its securement point 92 on the equipment base 88. In other words, since the pivotable plate sections 84 of the die plate 60A are connected to the pivotable plate sections 84 of the grab plate 58A via the actuator rods 76 of the swaging actuators 73 and to the pivotable plate sections 84 of the support plate 80 via the actuator cylinders 78 of the swaging actuators 73, operating the base actuator 90 to extend its actuator rod 76 out from its actuator cylinder 78 may facilitate transitioning the swage machine 38A from its opened state toward its closed state.

However, it should again be appreciated that the depicted example is merely intended to be illustrative and not limiting. In particular, in other embodiments, a base actuator 90 may be secured such that its actuator rod 76 is secured to the equipment base 88 of a swage machine 38 while is actuator cylinder 78 is secured to a corresponding pivotable plate section 84B. Alternatively, in other embodiments, a swage machine 38 may not include an equipment base 88. Furthermore, in other embodiments, a swage machine 38 may not include a base actuator 90, for example, when the swage machine 38 is to be manually transitioned between its opened state and its closed state.

In any case, as in the depicted example, to facilitate maintaining a swage machine 38 in its closed state, in some embodiments, the swage machine 38 may additionally include a pinning assembly 94. In particular, as in the depicted example, a pinning assembly 94 may include a manual pinning sub-assembly 96 having a manual pin 98. Additionally or alternatively, as in the depicted example, a pinning assembly 94 may include an automated pinning sub-assembly 100 having a pinning actuator 102.

However, it should again be appreciated that the depicted example is merely intended to be illustrative and not limiting. In particular, in other embodiments, a swage machine 38 may not include a pinning assembly 94, for example, when the swage machine 38 relies on base actuators 90 to hold the swage machine 38 in its closed state. Additionally, in other embodiments, a pinning assembly 94 of a swage machine 38 may include only a manual pinning sub-assembly 96 or only an automated pinning sub-assembly 100. Furthermore, in other embodiments, a manual pinning sub-assembly 96 may be implemented on the die plate 60 of a swage machine 38 while an automated pinning sub-assembly 100 may be implemented on the grab plate 58 of the swage machine 38.

In any case, as described above, a die seat 71 may be secured to the die plate 60 of a swage machine 38 to enable a die 70 to be loaded in the swage machine 38. Since the die plate 60A is implemented using multiple plate sections 84, in the depicted example, the die seat 71A is implemented using multiple die seat sections 104, which are each secured to a corresponding plate section 84 of the die plate 60A. Additionally, in the depicted example, the die 70A is implemented using multiple die segments 106, which are each secured in a corresponding die seat section 104.

Furthermore, as described above, a grab adapter 62 may be secured to the grab plate 58 of a swage machine 38 to facilitate securing the swage machine 38 to a pipe fitting 18. Since the grab plate 58A is implemented using multiple plate sections 84, in the depicted example, the grab adapter 62A is implemented using multiple grab adapter sections 108, which are each secured to a corresponding plate section 84 of the grab plate 58A.

However, it should again be appreciated that the depicted example is merely intended to be illustrative and not limiting. In particular, in other embodiments, a grab adapter 62 may include more than three (e.g., four, five, or more) grab adapter sections 108, for example, when a corresponding grab plate 58 includes more than three plate sections 84. Alternatively, in other embodiments, a grab adapter 62 may include fewer than three (e.g., two) grab adapter sections 108, for example, when a corresponding grab plate 58 includes fewer than three plate sections 84.

In any case, to facilitate securing the swage machine 38A to a pipe fitting 18, as depicted, each grab adapter section 108 includes a corresponding section of a grab tab 64, which is implemented (e.g., sized and/or shaped) to matingly interlock with a fitting grab notch 66 on the pipe fitting 18. However, at least in some instances, different pipe fittings 18 may have fitting grab notches 66 with different geometries (e.g., size, shape, and/or diameter). For example, a fitting grab notch 66 on a first pipe fitting 18 may be wider and/or deeper than a fitting grab notch 66 on a second pipe fitting 18. As another example, a fitting grab notch 66 on a pipe fitting 18 for smaller diameter (e.g., four inch) pipe segments 20 may have a smaller diameter while a fitting grab notch 66 on a pipe fitting 18 for larger diameter (e.g., six inch or eight inch) pipe segments 20 may have a larger diameter.

To facilitate enabling a swage machine 38 to accommodate pipe fittings 18 with a range of varying grab notch geometries, as depicted, each section 108 of the grab adapter 62A includes a base sub-section 110 and at least one modular sub-section 112. In particular, as in the depicted example, in some embodiments, a grab adapter base sub-section 110 may be secured to a corresponding grab plate section 84 via one or more threaded fasteners 68, such as a screw or a bolt. Additionally, a grab adapter modular sub-section 112 may be secured to a corresponding grab adapter base sub-section 110 and include a corresponding section of a grab tab 64. To enable a swage machine 38 to accommodate multiple different grab notch geometries, in some embodiments, different grab adapter modular sub-sections 112 may be selectively swapped into the grab adapter base sub-sections 110, for example, while the swage machine 38 is in its opened state.

Figure 6:
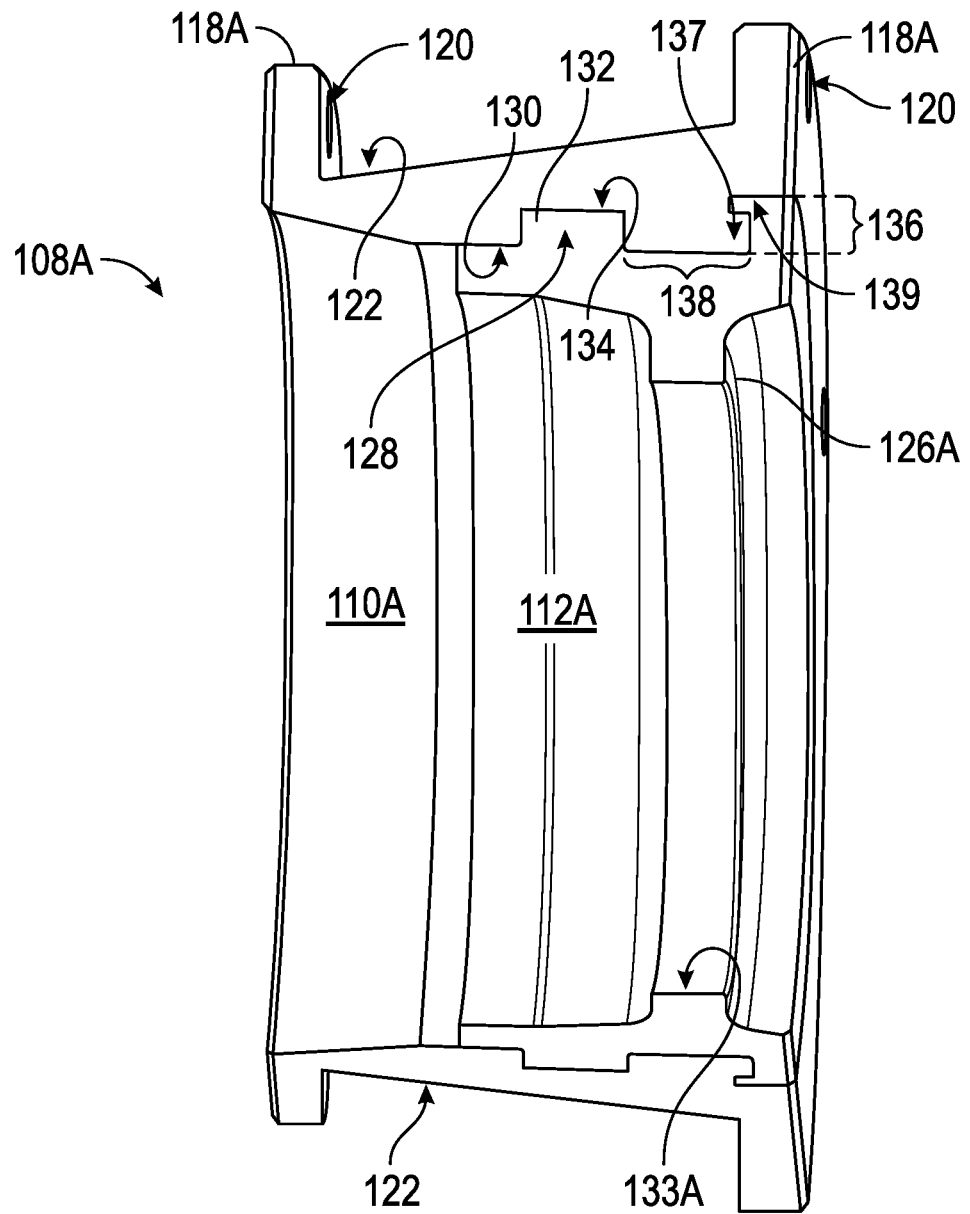
FIG. 6 is a side perspective view of an example of a section of a modular grab adapter section, which may be deployed in a swage machine, in accordance with an embodiment of the present disclosure.
Figure 7:
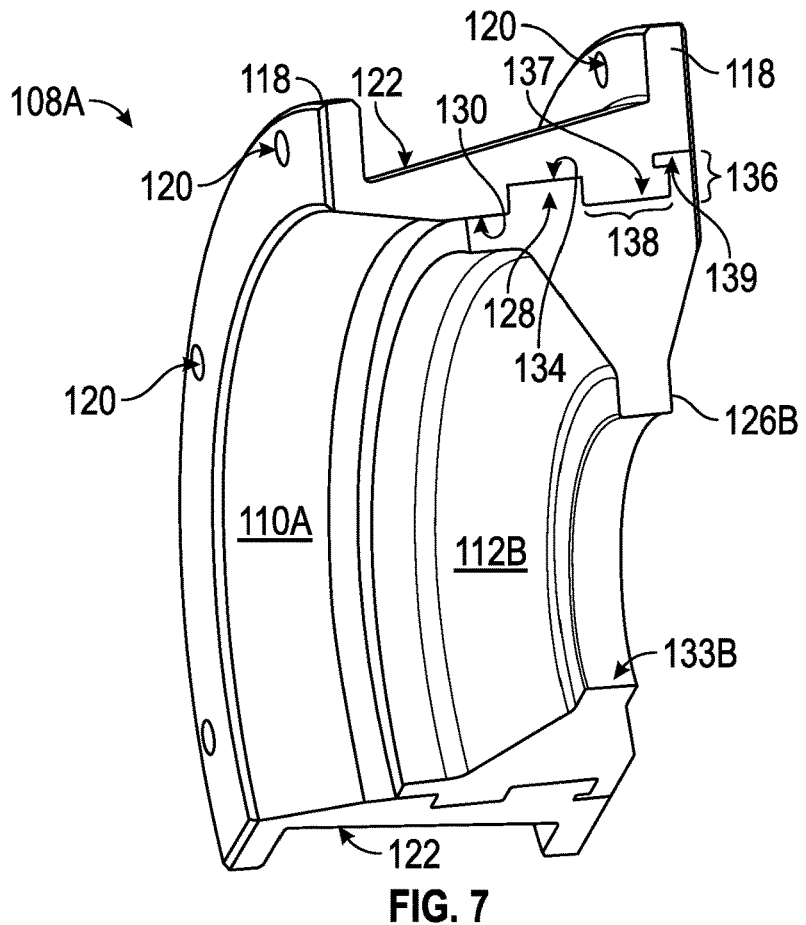
FIG. 7 is a side perspective view of another example of a section of a modular grab adapter, which may be deployed in a swage machine, in accordance with an embodiment of the present disclosure.

To help illustrate, an example of a grab adapter section 108A, which may be secured to a plate section 84 of a grab plate 58, in a first configuration is shown in FIG. 6 and an example of the grab adapter section 108B in a second configuration is shown in FIG. 7. In the depicted examples, the base sub-section 110A of the grab adapter section 108A includes side flanges 118A with fastener openings 120 formed therethrough to enable the base sub-section 110A to be secured to a corresponding plate section 84 via one or more threaded fasteners 68, such as a screw or a bolt. Additionally, in the depicted examples, the base sub-section 110A is formed such that its outer surface 122 tapers (e.g., narrows) radially inward away from a corresponding die plate 60 of a swage machine 38, for example, to facilitate improving transfer of axial force between the grab adapter section 108A and a corresponding grab plate section 84.

However, it should be appreciated that the depicted examples are merely intended to be illustrative and not limiting. In particular, in other embodiments, a grab adapter base sub-section 110 may be welded to or otherwise integrated with a corresponding grab plate section 84, for example, instead of being a discrete (e.g., separate) component that is secured to the grab plate section 84. Alternatively, as will be described in more detail below, in other embodiments, side flanges 118 of a grab adapter base sub-section 110 may not include fastener openings 120, for example, when the side flanges 118 include flange retainer protrusions that are implemented (e.g., sized and/or shaped) to matingly interlock (e.g., engage and/or interface) with plate retainer cavities in a corresponding grab plate section 84 and, thus, the grab adapter base sub-section 110 can be secured to the grab plate section 84 without using threaded fasteners 68, such as screw or a bolt. Furthermore, in other embodiments, the outer surface 122 of a grab adapter base sub-section 110 may not be tapered, for example, when side flanges 118 of the grab adapter base sub-section 110 are sufficient to transfer axial force between the grab adapter base sub-section 110 and a corresponding grab plate section 84.

In any case, as depicted, a first modular sub-section 112A, which has a grab tab section 126A with a first geometry on its inner surface 133A, is secured (e.g., attached) to the base sub-section 110A in FIG. 6 while a second modular sub-section 112B, which has a grab tab section 126B with a second (e.g., different) geometry on its inner surface 133B, is secured to the base sub-section 110A in FIG. 7. In particular, the grab tab section 126B on the second modular sub-section 112B extends out from the base sub-section 110A farther than the grab tab section 126A on the first modular sub-section 112A. Thus, in some embodiments, the second modular sub-section 112B may be used when a pipe fitting 18 that has a grab notch geometry with a smaller (e.g., four inch or six inch) outer surface diameter is to be swaged whereas the first modular sub-section 112A may be used when a pipe fitting 18 that has a grab notch geometry with a larger (e.g., eight inch or ten inch) outer surface diameter is to be swaged.

However, it should again be appreciated that the depicted examples are merely intended to be illustrative and not limiting. In particular, as mentioned above, in other embodiments, a grab adapter 62 may instead include a grab notch 66, which is implemented (e.g., sized and/or shaped) to matingly interlock with a grab tab 64 on a pipe fitting 18. Thus, in such embodiments, a modular sub-section 112 in a grab adapter section 108 of the grab adapter 62 may include a corresponding section of the grab notch 66, for example, instead of a grab tab section 126. Additionally, in other embodiments, a grab adapter section 108 may include more than two (e.g., three, four, or more) modular sub-sections 112 that may be selectively swapped in, for example, when the grab adapter section 108 is to be used to accommodate more than two different grab notch geometries. Furthermore, in other embodiments, a grab adapter section 108 may extend over a wider arc, for example, greater than one hundred twenty degrees when a corresponding grab plate 58 includes fewer than three (e.g., two) plate sections 84. Alternatively, in other embodiments, a grab adapter section 108 may extend over a shorter arc, for example, less than one hundred twenty degrees when a corresponding grab plate 58 includes more than three (e.g., four, five, or more) plate sections 84.

In any case, to facilitate securing a grab adapter modular sub-section 112 to a grab adapter base sub-section 110 and/or transferring axial force therebetween, as depicted, the grab adapter base sub-section 110 is formed to include a base alignment notch 128 on its inner surface 130 while the grab adapter modular sub-section 112 is formed to include a modular alignment tab 132, which is implemented (e.g., sized and/or shaped) to be disposed within the base alignment notch 128, on its outer surface 134. In some embodiments, a grab adapter modular sub-section 112 may be secured to a grab adapter base sub-section 110 via friction between the modular alignment tab 132 on the grab adapter modular sub-section 112 and the base alignment notch 128 on the grab adapter base sub-section 110. Additionally or alternatively, a grab adapter modular sub-section 112 and/or a grab adapter base sub-section 110 may be formed using magnetic material and, thus, the grab adapter modular sub-section 112 may be secured to the grab adapter base sub-section 110 via magnetic attraction.

To facilitate improving securement strength and/or transfer of axial force between a grab adapter modular sub-section 112 and a grab adapter base sub-section 110, as in the depicted example, in some embodiments, the grab adapter base sub-section 110 may be formed to include a base retainer protrusion 138 on its inner surface 130 while the grab adapter modular sub-section 112 may be formed to include a modular retainer protrusion 136 on its outer surface 134. In particular, in the depicted example, the base retainer protrusion 138 includes a lip, which is implemented (e.g., shaped and/or sized) to matingly interlock with a cavity 137 defined by the modular retainer protrusion 136, while the modular retainer protrusion 136 includes a lip, which may matingly interlock with a cavity 139 defined by the base retainer protrusion 138. In this manner, a section 108 of a modular grab adapter 62 may be implemented and/or deployed to enable a swage machine 38 to accommodate multiple different grab tab geometries, which, at least in some instances, may facilitate improving pipeline deployment efficiency, for example, by enabling the same swage machine 38 to be used with a variety of pipe fittings 18.

Moreover, implementing a grab adapter section 108 using a base sub-section 110 and one or more modular sub-sections 112 enables the total weight of the grab adapter section 108 to be divided between different components, which can be separately manipulated (e.g., moved). Comparatively, forming a grab adapter section 108 as a single unit may result in the weight of the grab adapter section 108 becoming unwieldly (e.g., greater than fifty pounds or twenty-three kilograms)—particularly as the outer surface diameters of fitting grab notches 66 decrease. Thus, at least in some instances, implementing a grab adapter section 108 using a base sub-section 110 and modular sub-sections 112 may facilitate further increasing the number of different grab tab geometries for which a swage machine 38 can be adapted to accommodate, for example, by enabling the swage machine 38 to accommodate a pipe fitting 18 using a grab adapter section 108 that has an unwieldly total weight, but manageable base sub-section weight and manageable modular sub-section weight.

However, it should again be appreciated that the depicted examples are merely intended to be illustrative and not limiting. In particular, in other embodiments, a grab adapter base sub-section 110 may not include a base retainer protrusion 138 and a grab adapter modular sub-section 112 may not include a modular retainer protrusion 136. Additionally or alternatively, to facilitate improving securement strength, in some embodiments, a grab adapter modular sub-section 112 may be secured to a grab adapter base sub-section 110 via one or more threaded fasteners 68, such as a bolt or a screw.

Figure 8:
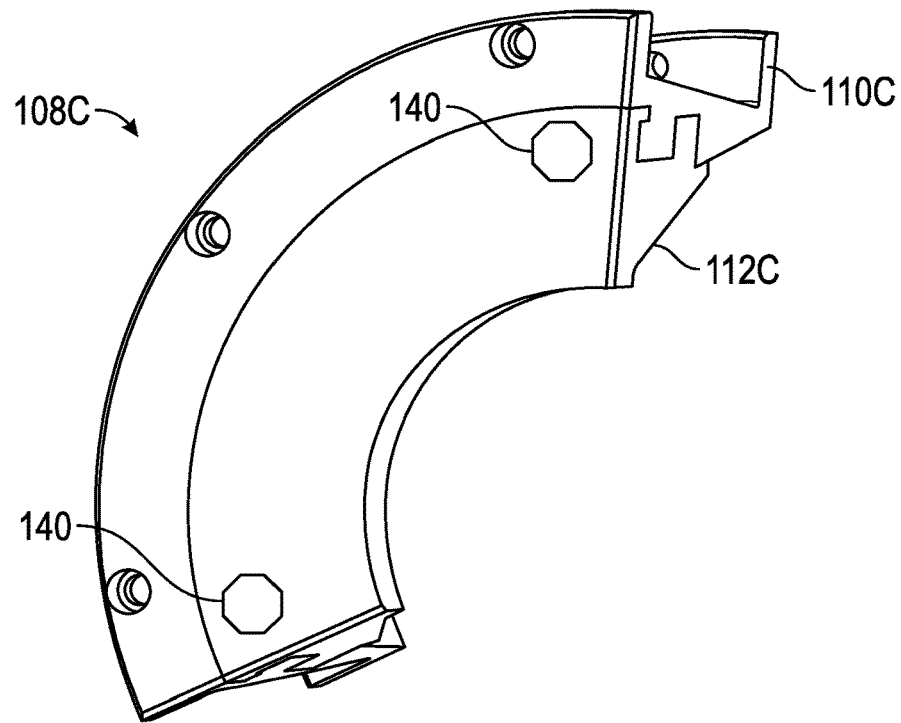
FIG. 8 is a frontal perspective view of a further example of a section of a modular grab adapter, which may be deployed in a swage machine, in accordance with an embodiment of the present disclosure.

To help illustrate, another example of a grab adapter section 108C, which may be secured to a plate section 84 of a grab plate 58, is shown in FIG. 8. Similar to FIGS. 6 and 7, as depicted, the grab adapter section 108C of FIG. 8 generally includes a base sub-section 110C and a modular sub-section 112C. However, the grab adapter section 108C of FIG. 8 additionally includes threaded fasteners 68—namely axial fasteners 140—and corresponding fastener openings 120, which are formed through the modular sub-section 112C to the base sub-section 110C.

Figure 9:
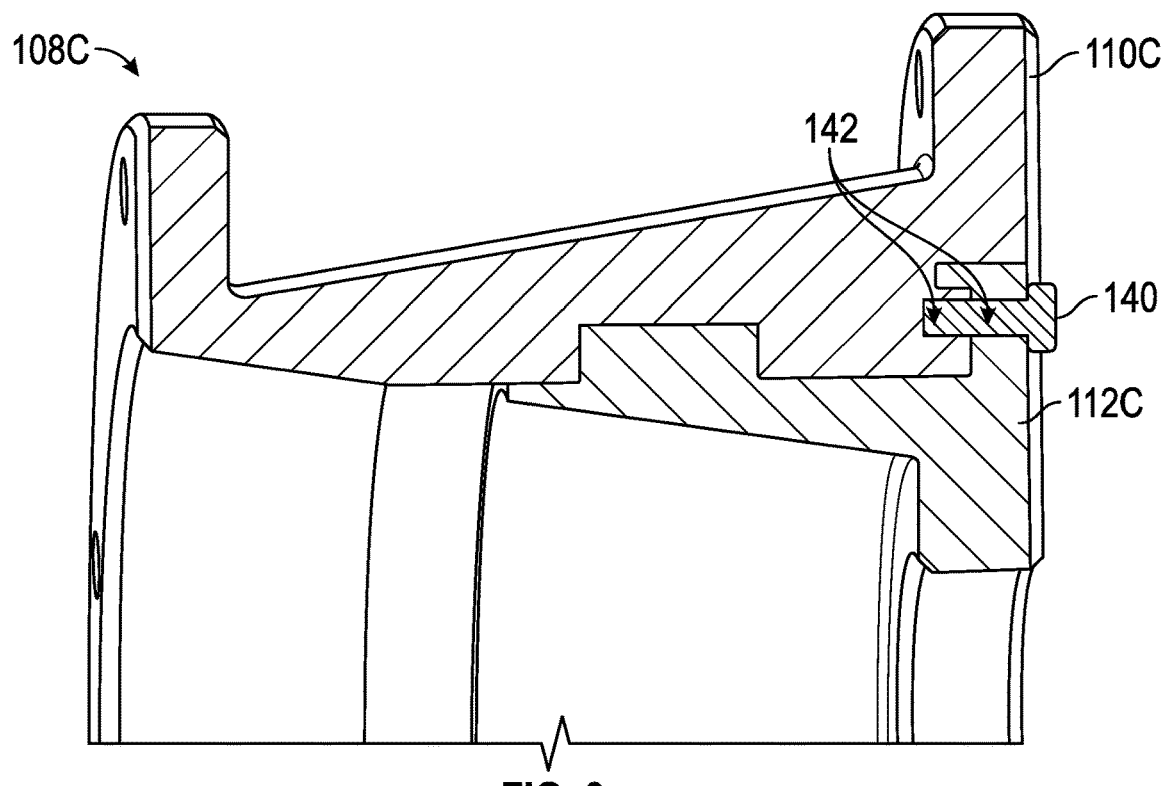
FIG. 9 is a cross-sectional view of the example modular grab adapter section of FIG. 8, in accordance with an embodiment of the present disclosure.

To help more clearly illustrate, a cross-sectional view of the grab adapter section 108C is shown in FIG. 9. As depicted, fastener openings 120—namely axial fasteners openings 142—are formed in the base sub-section 110C and the modular sub-section 112C. Thus, aligning the axial fastener openings 142 and disposing an axial fastener 140, such as a bolt or screw, therein may result in the axial fastener 140 engaging the modular sub-section 112C as well as the base sub-section 110C and, thus, facilitate improving securement of the modular sub-section 112C to the base sub-section 110C.

In particular, in some embodiments, an axial fastener 140 may be manually inserted into corresponding axial fastener openings 142, for example, by a user, an operator, and/or a service technician. However, in other embodiments, insertion of an axial fastener 140 may be automated. For example, in some such embodiments, insertion of an axial fastener 140 into corresponding axial fastener openings 142 may be controlled via an electrical actuator or a fluid actuator, such as a hydraulic actuator or a pneumatic actuator.

Figure 10:
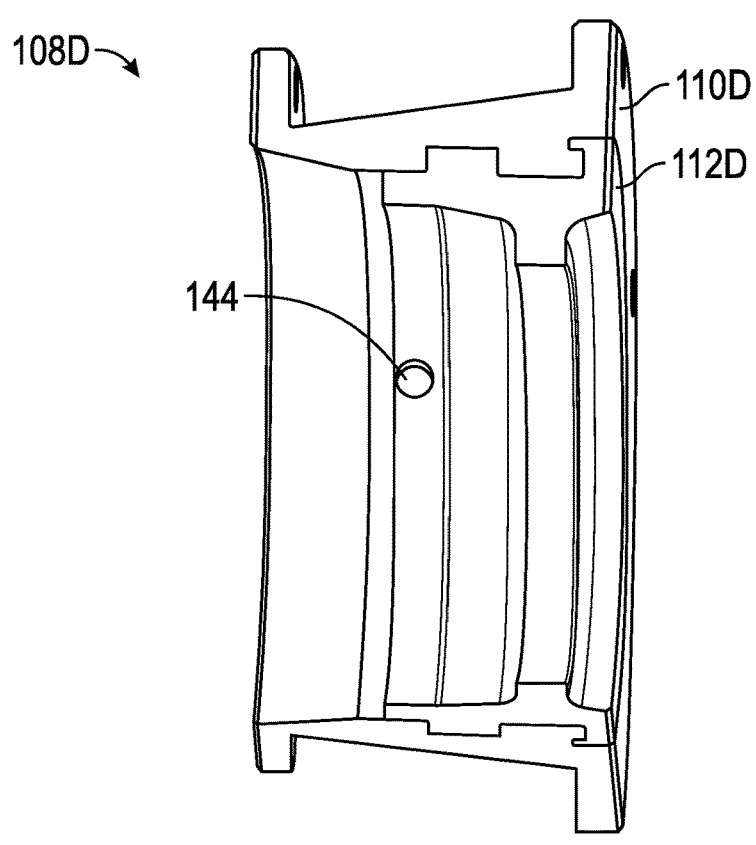
FIG. 10 is a side perspective view of another example of a section of a modular grab adapter section, which may be deployed in a swage machine, in accordance with an embodiment of the present disclosure.

To further help illustrate, another example of a grab adapter section 108D, which may be secured to a plate section 84 of a grab plate 58, is shown in FIG. 10. Similar to FIGS. 6 and 7, as depicted, the grab adapter section 108D of FIG. 10 generally includes a base sub-section 110D and a modular sub-section 112D. However, the grab adapter section 108D of FIG. 10 additionally includes threaded fasteners 68—namely radial fasteners 144—and corresponding fastener openings 120, which are formed through the modular sub-section 112D to the base sub-section 110D.

Figure 11:
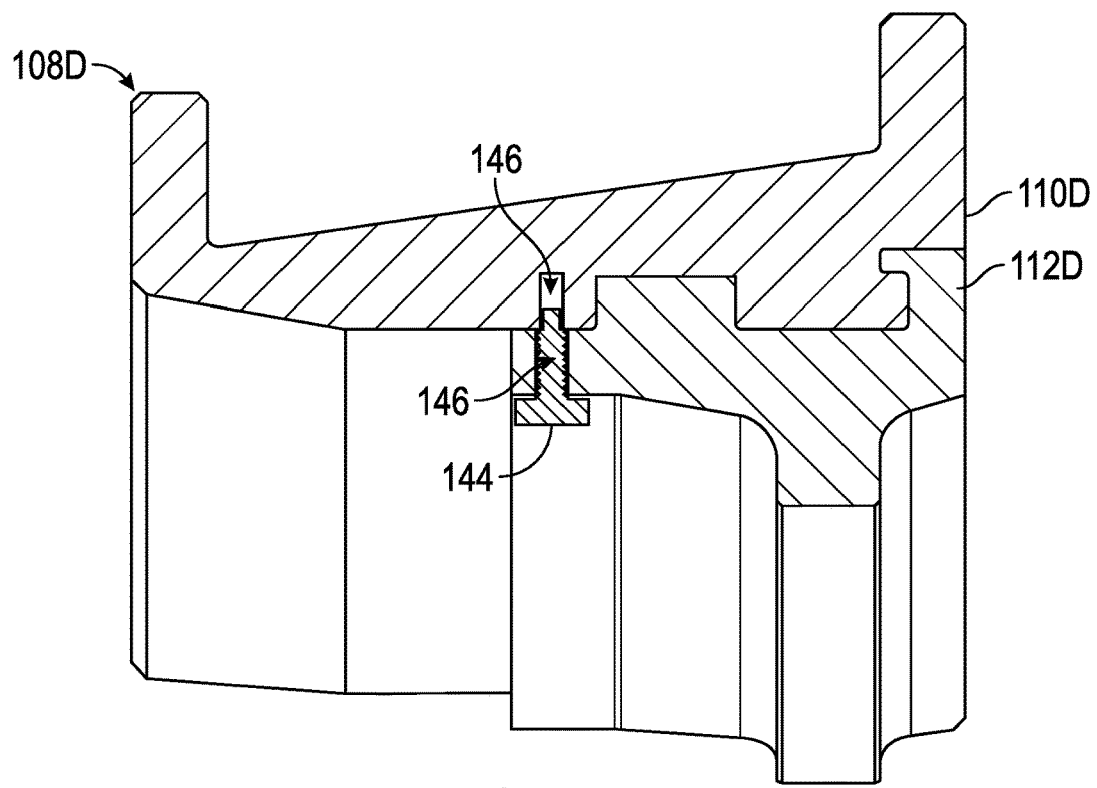
FIG. 11 is a cross-sectional view of the example modular grab adapter section of FIG. 9, in accordance with an embodiment of the present disclosure.

To help more clearly illustrate, a cross-sectional view of the grab adapter section 108D is shown in FIG. 11. As depicted, fastener openings 120—namely radial fasteners openings 146—are formed in the base sub-section 110D and the modular sub-section 112D. Thus, aligning the radial fastener openings 146 and disposing a radial fastener 144 therein may result in the radial fastener 144 engaging the modular sub-section 112D as well as the base sub-section 110D and, thus, facilitate improving securement of the modular sub-section 112D to the base sub-section 110D.

In particular, in some embodiments, a radial fastener 144 may be manually inserted into corresponding radial fastener openings 146, for example, by a user, an operator, and/or a service technician. However, in other embodiments, insertion of a radial fastener 144 may be automated. For example, in some such embodiments, insertion of a radial fastener 144 into corresponding radial fastener openings 146 may be controlled via an electrical actuator or a fluid actuator, such as a hydraulic actuator or a pneumatic actuator.

In any case, it should be appreciated that the depicted examples are merely intended to be illustrative and not limiting. In fact, in some embodiments, modular sub-sections 112 in a subset of grab adapter sections 108 may be secured via threaded fasteners 68 while modular sub-sections 112 in another subset of grab adapter sections 108 may not be secured via threaded fasteners 68. For example, in some such embodiments, the modular sub-section 112 in a grab adapter section 108 that is secured to a base grab plate section 84A may be secured to a corresponding base sub-section 110 via a threaded fastener 68 (e.g., to facilitate overcoming the tendency of gravity to pull the modular sub-section 112 away from the base sub-section 110) while the modular sub-section 112 in a grab adapter section 108 that is secured to a pivotable grab plate section 84B may be secured to a corresponding base sub-section 110 without using discrete threaded fasteners 68 (e.g., due to tendency of gravity to pull the modular sub-section 112 toward the base sub-section 110).

Moreover, as described above, in some embodiments, a grab adapter section 108 may include multiple modular sub-sections 112, which have different grab tab geometries, that may be selectively secured to its base sub-section 110 to facilitate accommodating multiple different grab notch geometries. To change from accommodating a grab notch geometry corresponding with the modular sub-section 112D of FIG. 11 to a different grab notch geometry, in some such embodiments, the depicted modular sub-section 112D may be swapped out for a different modular sub-section 112, which has a grab tab geometry that corresponds with the different grab notch geometry. However, to facilitate reducing its total footprint and/or total weight, in other embodiments, grab tab geometry of a grab adapter section 108 may be adjusted to accommodate a grab notch geometry with a smaller diameter by stacking multiple modular sub-sections 112 on the base sub-section 110 of the grab adapter section 108.

Figure 12:
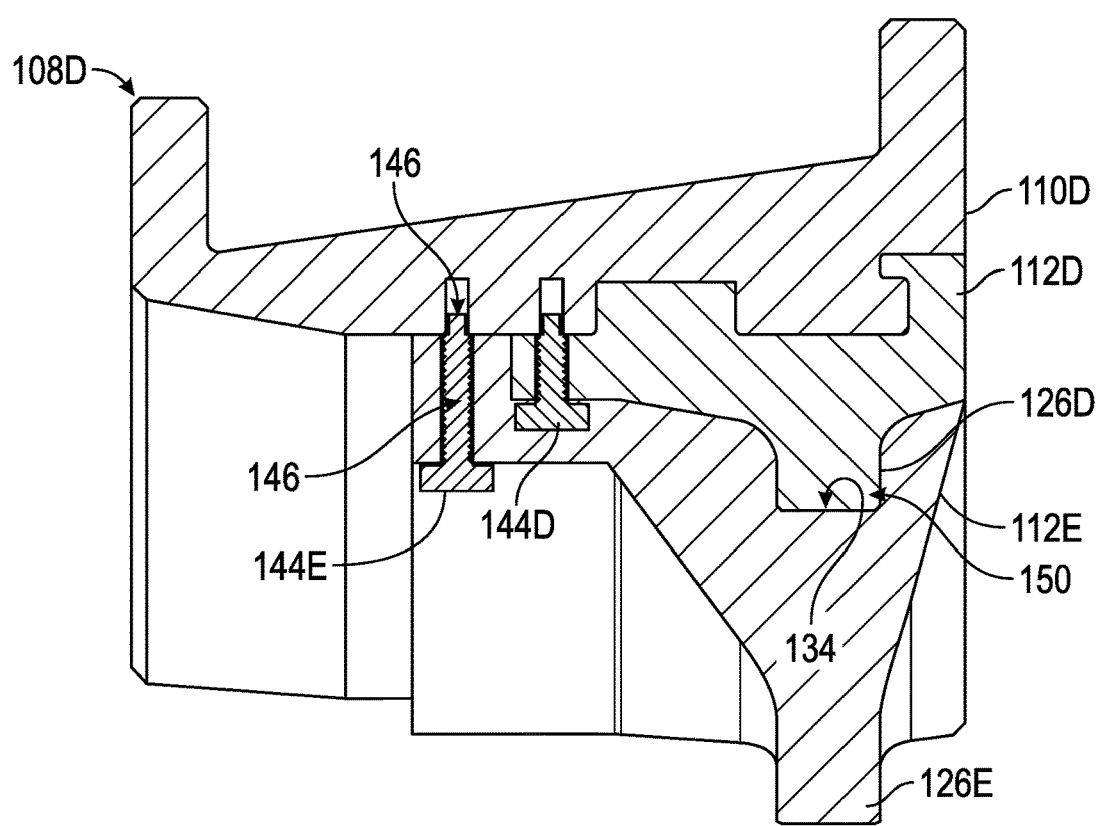
FIG. 12 is a cross-sectional view of a further example of a section of a modular grab adapter, which may be deployed in a swage machine, in accordance with an embodiment of the present disclosure.

To help illustrate, the grab adapter section 108D, which is shown in a first configuration that accommodates a first grab notch geometry in FIG. 11, is shown in a second configuration that accommodates a second (e.g., different) grab notch geometry in FIG. 12. Similar to FIG. 11, as depicted in FIG. 12, a first (e.g., initial and/or outer) modular sub-section 112D is secured to the base sub-section 110D via a first radial fastener 144D. Additionally, the first modular sub-section 112D includes a grab tab section 126D, which is implemented (e.g., sized and/or shaped) to interlock with a first grab notch geometry (e.g., larger diameter).

However, to accommodate a second grab notch geometry that has a smaller diameter, as depicted in FIG. 12, a second (e.g., other, subsequent, and/or inner) modular sub-section 112E, which has a grab tab section 126E with a different geometry as compared to the grab tab section 126D on the first modular sub-section 112D, is secured to the base sub-section 110D over the first modular sub-section 112D. To facilitate transferring axial force from the second modular sub-section 112E to the first modular sub-section 112D and, thus, the base sub-section 110D and/or securing the second modular sub-section 112E to the first modular sub-section 112D and, thus, the base sub-section 110D, as depicted, an outer surface 134 of the second modular sub-section 112E includes an adapter grab notch 150, which is implemented (e.g., sized and/or shaped) to enable the grab tab section 126D on the first modular sub-section 112D to be disposed therein. In particular, in some embodiments, the second modular sub-section 112E may be secured to the first modular sub-section 112D at least in part using friction between the grab tab section 126D on the first modular sub-section 112D and the adapter grab notch 150 in the second modular sub-section 112E. Additionally or alternatively, the first modular sub-section 112D and/or the second modular sub-section 112E may be formed using magnetic material and, thus, the second modular sub-section 112E may be secured to the first modular sub-section 112D via magnetic attraction.

Nevertheless, similar to the first modular sub-section 112D, to facilitate improving securement strength, in some embodiments, the second modular sub-section 112E may be secured at least in part via a second radial fastener 144E disposed within aligned radial fastener openings 146 in the grab adapter base sub-section 110D and the second grab adapter modular sub-section 112E. Additionally, similar to the first radial fastener 144D, in some embodiments, the second radial fastener 144E may be manually inserted into corresponding radial fastener openings 146, for example, by a user, an operator, and/or a service technician. However, in other embodiments, insertion of the second radial fastener 144E may be automated. For example, in some such embodiments, insertion of the second radial fastener 144E into corresponding radial fastener openings 146 may be controlled via an electrical actuator or a fluid actuator, such as a hydraulic actuator or a pneumatic actuator.

However, it should be appreciated that the depicted example is intended to be illustrative and not limiting. In particular, in other embodiments, a grab adapter section 108 may include more than two (e.g., three, four, or more) modular sub-sections 112 concurrently secured to its base sub-sections 110. Additionally, as mentioned above, in other embodiments, the side flanges 118 in the base sub-section 110 of a grab adapter 62 may include flange retainer protrusions that are implemented (e.g., sized and/or shaped) to matingly interlock (e.g., engage and/or interface) with plate retainer cavities in a corresponding grab plate section 84, for example, to enable the grab adapter base sub-section 110 to be secured to the grab plate section 84 without using a threaded fastener 68, such as screw or a bolt.

To help illustrate, a further example of a grab adapter section 108E, which is secured to a plate section 84 of a grab plate 58, is shown in FIG. 12. Similar to FIGS. 6 and 7, the grab adapter section 108E of FIG. 12 generally includes a base sub-section 110E and a modular sub-section 112E. Additionally, similar to FIGS. 6 and 7, the base sub-section 110E of FIG. 12 generally includes side flanges 118E.

However, as depicted in FIG. 12, each side flange 118E of the base sub-section 110E includes a flange retainer protrusion 149 that extends axially inward from a remainder of the side flange 118E, for example, instead of being completely vertical. In particular, as in the depicted example, a flange retainer protrusion 149 on a side flange 118 of a grab adapter base sub-section 110 may extend substantially perpendicular to the remainder of the side flange 118. Additionally, as in the depicted example, a flange retainer protrusion 149 on a side flange 118 of a grab adapter base sub-section 110 may be implemented (e.g., sized and/or shaped) to matingly interlock with a corresponding plate retainer cavity 151 that is formed in a grab plate section 84.

Accordingly, in such embodiments, the grab adapter base sub-section 110E may be secured to the grab plate section 84 via engagement of flange retainer protrusions 149 on the side flanges 118 of the grab adapter base sub-section 110E with plate retainer cavities 151 in the grab plate section 84 as well as friction between the grab adapter base sub-section 110E and grab plate section 84. In fact, in some such embodiments, securing a grab adapter base sub-section 110 to a corresponding grab plate section 84 via flange retainer protrusions 149 on the grab adapter base sub-section 110 and plate retainer cavities 151 in the grab plate section 84 may obviate a threaded fastener 68, such as bolt or a screw. In other words, in some embodiments, the side flanges 118E of the grab adapter base sub-section 110E may not include fastener openings 120 formed therethrough.

However, to facilitate improving securement strength, in other embodiments, a grab adapter base sub-section 110 that includes flange retainer protrusions 149 on its side flanges 118 may nevertheless include one or more fastener openings 120 formed therethrough, for example, to enable the grab adapter base sub-section 110 to be secured to a corresponding grab plate section 84 via a threaded fastener 68. In any case, in this manner, sections 108 of a modular grab adapter 62 may be implemented and/or deployed to enable a swage machine 38 to accommodate multiple different grab tab geometries, which, at least in some instances, may facilitate improving pipeline deployment efficiency, for example, by enabling the same swage machine 38 to be used with a variety of pipe fittings 18.

Figure 13:
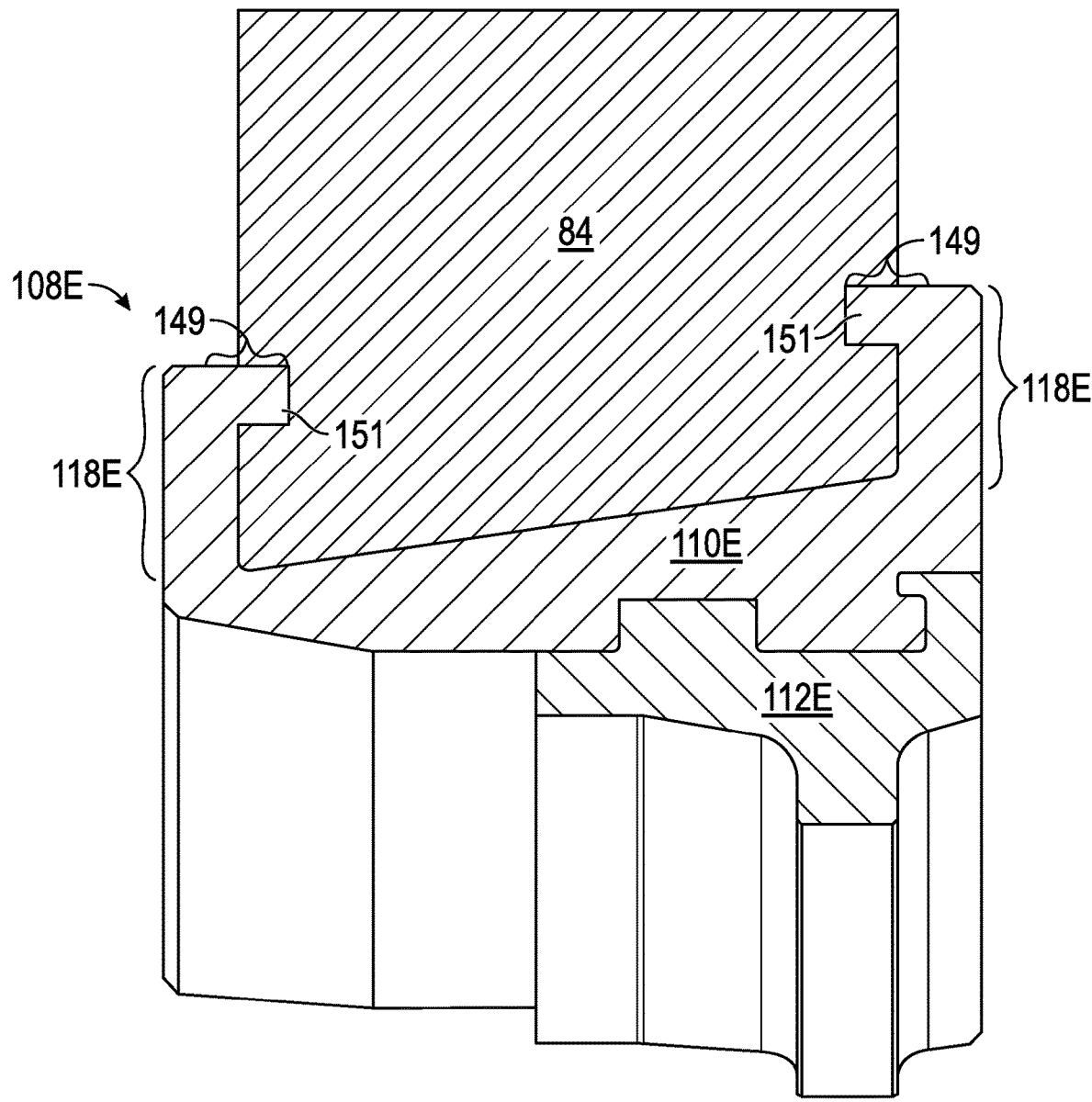
FIG. 13 is a cross-sectional view of another example of a section of a modular grab adapter secured to a grab plate section, in accordance with an embodiment of the present disclosure.

To help further illustrate, an example of a process 152 for implementing (e.g., manufacturing) a section 108 of a modular grab adapter 62 is described in FIG. 13. Generally, the process 152 includes implementing a grab adapter base sub-section with an alignment notch (process block 154). Additionally, the process 152 generally includes implementing a grab adapter modular sub-section with an alignment tab and a grab tab section (process block 156).

Although described in a specific order, which corresponds with an embodiment of the present disclosure, it should be appreciated that the example process 152 is merely intended to be illustrative and non-limiting. In particular, in other embodiments, a process 152 for implementing a section 108 of a modular grab adapter 62 may include one or more additional process blocks and/or omit one or more of the depicted process blocks. For example, some embodiments of the process 152 may additionally include implementing another grab adapter modular sub-section with another grab tab section (process block 158) while other embodiments of the process 152 do not. Moreover, in other embodiments, one or more of the depicted process blocks may be performed in a different order, for example, such that the grab adapter modular sub-section is implemented before the grab adapter base sub-section.

In any case, as described above, a section 108 of a modular grab adapter 62, which corresponds with a plate section 84 of a grab plate 58 in a swage machine 38, may generally include a base sub-section 110 that is implemented (e.g., formed, forged, cast, and/or milled) to include a base alignment notch 128 on its inner surface 130. As such, implementing a grab adapter section 108 may generally include implementing (e.g., forming, forging, casting, and/or milling) a grab adapter base sub-section 110 with a base alignment notch 128 on its inner surface 130 (process block 154). In particular, in some embodiments, a grab adapter base sub-section 110 may be made at least in part using metal, such as carbon steel, stainless steel, duplex stainless steel, super duplex stainless steel, or any combination thereof.

Additionally, as described above, in some embodiments, a grab adapter base sub-section 110 may include one or more fastener openings 120 formed therein, for example, to facilitate securing the grab adapter base sub-section 110 to a grab plate section 84 and/or securing a grab adapter modular sub-section 112 to the grab adapter base sub-section 110. In other words, in such embodiments, implementing a grab adapter base sub-section 110 may include forming (e.g., milling, forging, and/or casting) one or more fastener openings 120 in the grab adapter base sub-section 110 (process block 160). In particular, as described above, in some such embodiments, one or more fastener openings 120 may be formed through side flanges 118 of a discrete base sub-section 110 to enable the base sub-section to be secured to a corresponding grab plate section 84 via one or more threaded fasteners 68, such as a bolt or a screw. Thus, in such embodiments, implementing a grab adapter base sub-section 110 may include forming (e.g., implementing, forging, casting, and/or milling) the grab adapter base sub-section 110 with side flanges 118, for example, including one or more fastener openings 120 formed therethrough and/or flange retainer protrusions 149 that extend inwardly from the remainder of the side flanges 118 (process block 161).

Furthermore, as described above, to facilitate supplementing axial force transfer to a corresponding grab plate section 84 that is provided by side flanges 118 of a discrete grab adapter base sub-section 110, in some embodiments, an outer surface 122 of the grab adapter base sub-section 110 may include a taper that narrows moving away from a corresponding die plate 60. Thus, in such embodiments, implementing a grab adapter base sub-section 110 may include forming (e.g., implementing, forging, milling, and/or casting) an outer surface 122 of the base sub-section 110 such that it has a narrowing taper (process block 162).

However, as described above, in other embodiments, a grab adapter base sub-section 110 may be integrated with a corresponding grab plate section 84, for example, instead of being a discrete (e.g., separate) component. Thus, in such embodiments, implementing a grab adapter base sub-section 110 may include forming (e.g., implementing, forging, milling, and/or casting) a plate section 84 of a grab plate 58 to include an integrated base sub-section 110 (process block 164).

In any case, as described above, to facilitate securing a swage machine 38 to a pipe fitting 18, a section 108 of a modular grab adapter 62 may generally include a modular sub-section 112 that has a grab tab section 126, which is implemented (e.g., sized and/or shaped) to matingly interlock with a grab notch 66 on the pipe fitting 18, on its inner surface 133. Additionally, as described above, to facilitate securing a grab adapter modular sub-section 112 to a grab adapter base sub-section 110 and/or transferring axial force therebetween, the grab adapter base sub-section 110 may include a base alignment notch 128 on its inner surface 130 and the grab adapter modular sub-section 112 may include a modular alignment tab 132, which is implemented (e.g., sized and/or shaped) to be disposed within the base alignment notch 128, on its outer surface 134. As such, implementing a grab adapter section 108 may generally include implementing (e.g., forming, casting, and/or milling) a grab adapter modular sub-section 112 with a grab tab section 126 on its inner surface 133 and a modular alignment tab 132 on its outer surface 134 (process block 156). In particular, in some embodiments, a grab adapter modular sub-section 112 may be made at least in part using metal, such as carbon steel, stainless steel, duplex stainless steel, super duplex stainless steel, or any combination thereof.

To facilitate improving securement strength, as described above, in some embodiments, a grab adapter modular sub-section 112 may be secured to a grab adapter base sub-section 110 via one or more threaded fasteners 68. Thus, in such embodiments, implementing a grab adapter modular sub-section 112 may include forming (e.g., implementing, milling, and/or casting) one or more fasteners openings 120 in the grab adapter modular sub-section 112 (process block 168). In particular, as described above, in some such embodiments, one or more axial fastener openings 142 and/or one or more radial fastener openings 146 may be formed through the grab adapter modular sub-section 112.

Additionally or alternatively, as described above, to facilitate improving securement strength, in some embodiments, a grab adapter modular sub-section 112 may include a modular retainer protrusion 136 on its outer surface 134 while a corresponding grab adapter base sub-section 110 may include a base retainer protrusion 138 on its inner surface 130. In particular, in such embodiments, the modular retainer protrusion 136 may be implemented (e.g., shaped and/or sized) to matingly interlock with a cavity 139 defined by the base retainer protrusion 138 while the base retainer protrusion 138 may be implemented to matingly interlock with a cavity 137 defined by the modular retainer protrusion 136, thereby facilitating securement of the grab adapter modular sub-section 112 to the grab adapter base sub-section 110. Accordingly, in such embodiments, implementing a grab adapter base sub-section 110 may include forming (e.g., implementing, milling, and/or casting) the grab adapter base sub-section 110 with a base retainer protrusion 138 on its inner surface 130 (process block 166) and implementing a grab adapter modular sub-section 112 may include forming the grab adapter modular sub-section 112 with a modular retainer protrusion 136 on its outer surface 134 (process block 170).

Furthermore, as described above, to facilitate accommodating multiple different grab notch geometries, in some embodiments, a grab adapter section 108 may include multiple modular sub-sections 112, which may be selectively secured to its base sub-section 110. Thus, in such embodiments, implementing a grab adapter section 108 may include implementing (e.g., forging, casting, and/or milling) another grab adapter modular sub-section 112 with another grab tab section 126, for example, such that the other grab tab section 126 is implemented (e.g., sized and/or shaped) to accommodate a different grab notch geometry as compared to the grab tab section 126 on the grab adapter modular sub-section 112 (process block 158). Similar to the grab adapter modular sub-section 112, in some embodiments, the other grab adapter modular sub-section 112 may be made at least in part using metal, such as carbon steel, stainless steel, duplex stainless steel, super duplex stainless steel, or any combination thereof.

Additionally, similar to the grab adapter modular sub-section 112, to facilitate improving securement strength, in some embodiments, the other grab adapter modular sub-section 112 may be secured to the grab adapter base sub-section 110 via one or more threaded fasteners 68. Thus, in such embodiments, implementing the other grab adapter modular sub-section 112 may include forming (e.g., implementing, milling, and/or casting) one or more fasteners openings 120 in the other grab adapter modular sub-section 112 (process block 172). In particular, as described above, in some such embodiments, one or more axial fastener openings 142 and/or one or more radial fastener openings 146 may be formed through the other grab adapter modular sub-section 112.

Additionally or alternatively, similar to the grab adapter modular sub-section 112, to facilitate improving securement strength, in some embodiments, the other grab adapter modular sub-section 112 may include another modular retainer protrusion 136 on its outer surface 134. In particular, in such embodiments, the other modular retainer protrusion 136 may be implemented (e.g., shaped and/or sized) to matingly interlock with a cavity 139 defined by the base retainer protrusion 138 on the grab adapter base sub-section 110 while the base retainer protrusion 138 may be implemented to matingly interlock with a cavity 137 defined by the other modular retainer protrusion 136, thereby facilitating securement of the other grab adapter modular sub-section 112 to the grab adapter base sub-section 110. Accordingly, in such embodiments, implementing the other grab adapter modular sub-section 112 may include forming (e.g., implementing, milling, forging, and/or casting) the other grab adapter modular sub-section 112 with another modular retainer protrusion 136 on its outer surface 134 (process block 174).

Furthermore, similar to the grab adapter modular sub-section 112, to facilitate securing the other grab adapter modular sub-section 112 directly against the grab adapter base sub-section 110 and/or transferring axial force therebetween, in some embodiments, the other grab adapter modular sub-section 112 may include another modular alignment tab 132, which is disposed within a base alignment notch 128 in the grab adapter base sub-section 110, on its outer surface 134. Thus, in such embodiments, implementing the other grab adapter section 108 may include implementing (e.g., forming, forging, casting, and/or milling) the other grab adapter modular sub-section 112 with another modular alignment tab 132 on its outer surface 134 (process block 176).

However, as described above, in other embodiments, multiple grab adapter modular sub-sections 112 may be concurrently secured to a grab adapter modular sub-section 112, for example, instead of being swapped out. In particular, in some such embodiments, an initial (e.g., first and/or outer) modular sub-section 112 may be secured to the base sub-section 110 and another (e.g., second, subsequent, and/or inner) modular sub-section 112 may be secured to the base sub-section 110 such that the other modular sub-section 112 covers the modular sub-section 112. To facilitate securing the other modular sub-section 112 to the modular sub-section 112 and/or transferring axial force therebetween, in such embodiments, the other modular sub-section 112 may include an adapter grab notch 150, which is implemented (e.g., sized and/or shaped) to enable a grab tab section 126 on the modular sub-section 112 to be disposed therein, on its outer surface 134, for example, instead of a modular alignment tab 132. Accordingly, in such embodiments, implementing the other grab adapter modular sub-section 112 may include forming (e.g., implementing, casting, milling, and/or forging) the other grab adapter modular sub-section with an adapter grab notch 150 on its outer surface 134 (process block 178). In this manner, a section 108 of a modular grab adapter 62 to be deployed at a corresponding grab plate section 84 in a swage machine 38 may be implemented (e.g., manufactured) to enable the swage machine 38 to accommodate multiple different grab notch geometries, which, least in some instances, may facilitate improving pipeline deployment efficiency, for example, by enabling the same swage machine 38 to be used with a variety of pipe fittings 18.

Figure 14:
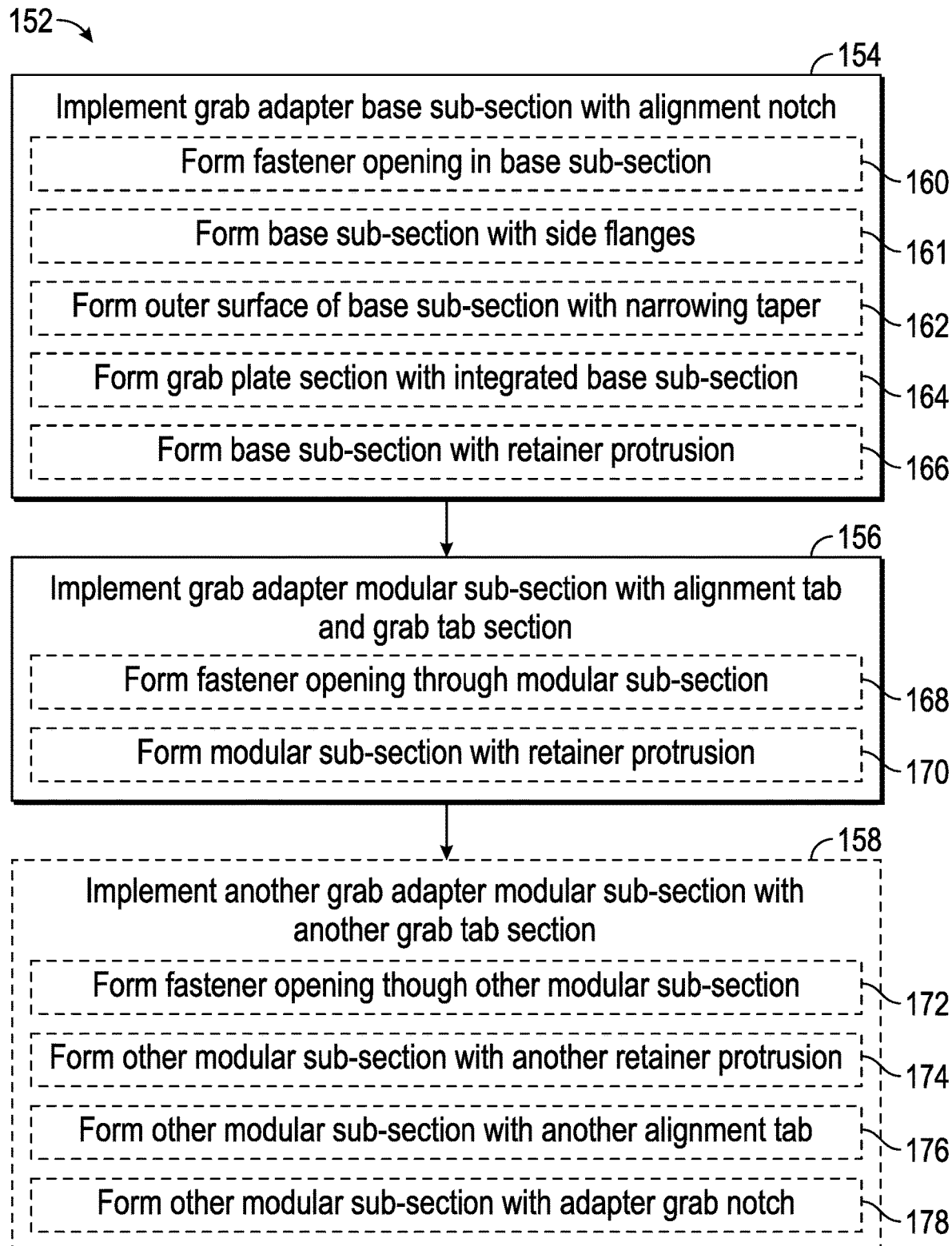
FIG. 14 is a flow diagram of an example of a process for implementing (e.g., manufacturing) a section of a modular grab adapter, in accordance with an embodiment of the present disclosure.
Figure 15:
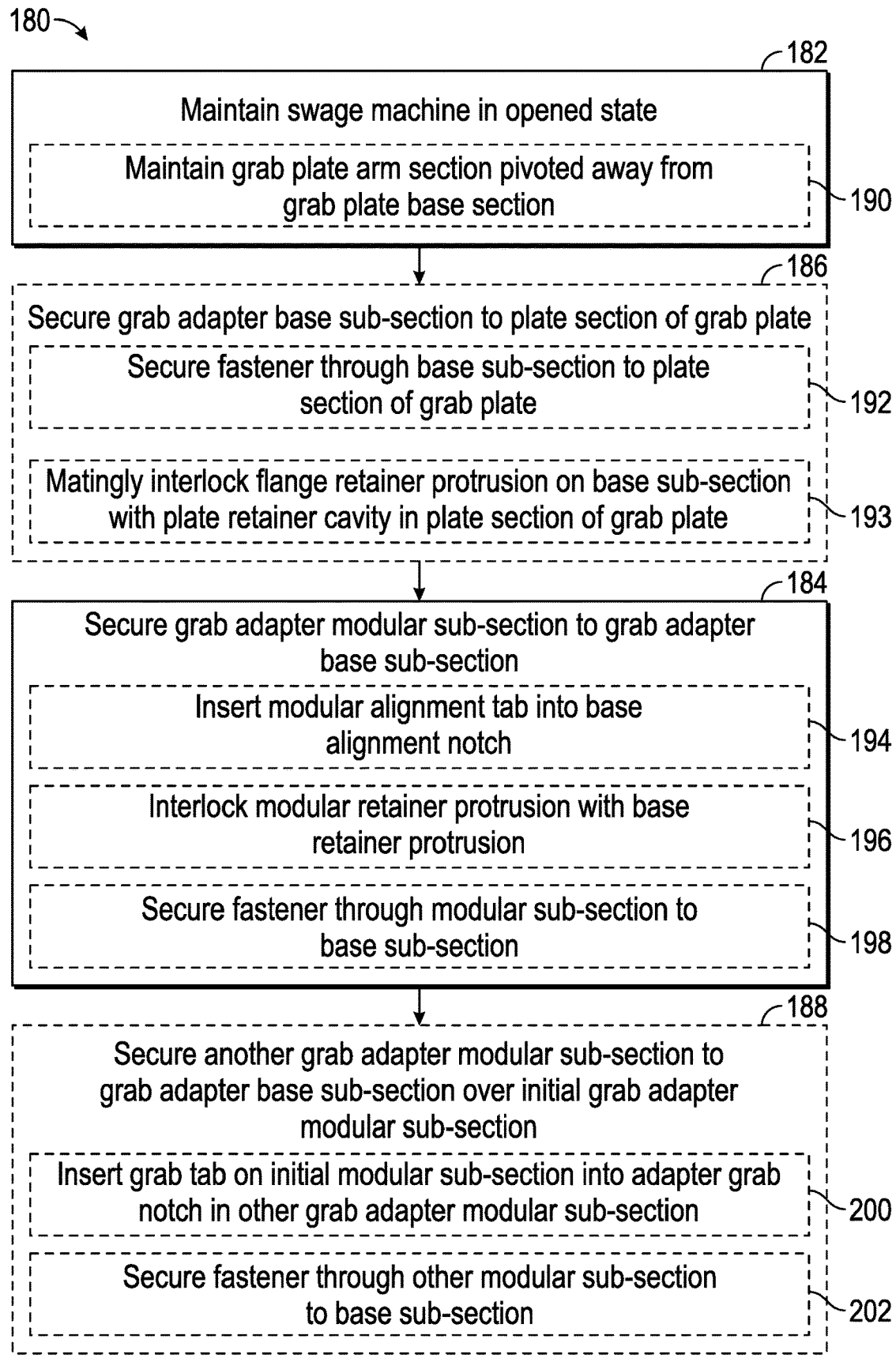
FIG. 15 is a flow diagram of an example of a process for deploying (e.g., installing) a section of a modular grab adapter in a swage machine, in accordance with an embodiment of the present disclosure.

To help further illustrate, an example of a process 180 for deploying (e.g., installing) a section 108 of a modular grab adapter 62 in a swage machine 38 is described in FIG. 14. Generally, the process 180 includes maintaining a swage machine in an opened state (process block 182). Additionally, the process 180 generally includes securing a grab adapter modular sub-section to a grab adapter base sub-section, which is secured to or integrated with a grab plate of the swage machine (process block 184).

Although described in a specific order, which corresponds with an embodiment of the present disclosure, it should be appreciated that the example process 180 is merely intended to be illustrative and non-limiting. In particular, in other embodiments, a process 180 for deploying a section 108 of a modular grab adapter 62 in a swage machine 38 may include one or more additional process blocks and/or omit one or more of the depicted process blocks. For example, some embodiments of the process 180 may additionally include securing the grab adapter base sub-section to a plate section of the grab plate (process block 186) while other embodiments of the process do not. As another example, some embodiments of the process 180 may additionally include securing another grab adapter modular sub-section to the grab adapter base sub-section over the grab adapter modular sub-section (process block 188) while other embodiments of the process 180 do not.

In any case, as described above, since a pipe fitting 18 to be swaged may not necessarily be at an end of a pipeline system 10, a swage machine 38 may be implemented and/or operated to selectively transition between an opened state, which enables the swage machine 38 to be deployed at or removed from the pipe fitting 18, and a closed state, which enables the swage machine 38 to swage the pipe fitting 18. Additionally, a grab adapter 62 may generally be secured to the grab plate 58 of a swage machine 38 while the swage machine 38 is in its opened state. Accordingly, deploying a section 108 of a modular grab adapter 62 in a swage machine 38 may generally include maintaining the swage machine 38 in its opened state (process block 182).

To enable a swage machine 38 to transition between an opened state and a closed state, as described above, the grab plate 58 and the die plate 60 of the swage machine 38 may each include a base plate section 84A and one or more pivotable plate sections 84B. In particular, to transition from the closed state toward the opened state, a pivotable grab plate section 84B may be pivoted away from a corresponding base grab plate section 84A. Accordingly, maintaining a swage machine 38 in its opened state may include maintaining a pivotable plate section 84B of its grab plate 58 pivoted away from the base plate section 84A of the grab plate 58 (process block 190).

Additionally, as described above, in some embodiments, a swage machine 38 may be manually transitioned between its opened state and its closed state, for example, by a user, an operator, or a service technician. However, since actuator rods 76 of swaging actuators 73 extend between plate sections 84 of its grab plate 58 and corresponding plate sections 84 of its die plate 60, in other embodiments, a swage machine 38 may be transitioned between its opened state and its closed state in an automated manner. In particular, in such embodiments, the swage machine 38 may be transitioned via one or more base actuators 90, which are each secured between an equipment base 88 that is attached to the base plate section 84A of the die plate 60 and a corresponding pivotable plate section 84B of the die plate 60.

In any case, as described above, a section 108 of a modular grab adapter 62 generally includes a base sub-section 110. In particular, in some embodiments, the base sub-section 110 may be integrated with a plate section 84 of a grab plate 58. However, in other embodiments, the grab adapter base sub-section 110 may be a discrete (e.g., separate) component. Thus, in such embodiments, deploying a section 108 of a modular grab adapter 62 in a swage machine 38 may generally include securing its base sub-section 110 to a corresponding grab plate section 84 in the swage machine 38 (process block 186).

In particular, as described above, in some embodiments, a discrete grab adapter base sub-section 110 may be secured to a grab plate section 84 via one or more threaded fasteners 68, such as a bolt or a screw. To enable securement via a threaded fastener 68, a fastener opening 120 may be formed through a side flange 118 of the grab adapter base sub-section 110 and another fastener opening 120, which can be aligned with the fastener opening 120 in the grab adapter base sub-section 110, may be formed in the grab plate section 84. In other words, in such embodiments, securing a discrete grab adapter base sub-section 110 to a corresponding grab plate section 84 may include securing a threaded fastener 68 in corresponding fastener openings 120 formed in the grab adapter base sub-section 110 and the grab plate section 84, thereby securing the threaded fastener 68 through the grab adapter base sub-section 110 to the grab plate section 84 (process block 192).

However, as described above, in some embodiments, a discrete grab adapter base sub-section 110 may additionally or alternatively be secured to a grab plate section 84 via flange retainer protrusions 149 on the side flanges 118 of the grab adapter base sub-section 110. To enable securement via flange retainer protrusions 149, corresponding plate retainer cavities 151, which are implemented (e.g., sized and/or shaped) to matingly interlock (e.g., engage and/or interface) with the flange retainer protrusions 149 may be formed in the grab plate section 84. In other words, in such embodiments, securing a discrete grab adapter base sub-section 110 to a corresponding grab plate section 84 may include matingly interlocking a flange retainer protrusion 149 on a side flange 118 of the grab adapter base sub-section 110 with a corresponding plate retainer protrusion 151 in the grab plate section 84 (process block 193).

In any case, as described above, in addition to a base sub-section 110, a section 108 of a modular grab adapter 62 may include a modular sub-section 112, which has a grab tab section 126 that is implemented (e.g., sized and/or shaped) to matingly interlock with a grab notch 66 on a pipe fitting 18. Thus, to facilitate securing a swage machine 38 to the pipe fitting 18, the modular sub-section 112 may be secured to the base sub-section 110. In other words, deploying a section 108 of a modular grab adapter 62 in a swage machine 38 may generally include securing a grab adapter modular sub-section 112 to its grab adapter base sub-section 110 (process block 184).

In fact, as described above, to facilitate increasing the number of different grab notch geometries a modular grab adapter 62 and, thus, a corresponding swage machine 38 can accommodate, in some embodiments, a section 108 of the modular grab adapter 62 may include multiple modular sub-section 112, which have grab tab sections 126 with varying geometries (e.g., size, shape, and/or diameter). Additionally, in some such embodiments, each grab adapter modular sub-section 112 may be implemented (e.g., sized and/or shaped) to be secured directly against the base sub-section 110. Thus, in such embodiments, the grab adapter modular sub-section 112 that is actually secured to the grab adapter base sub-section 110 may be selected based on the grab notch geometry of a pipe fitting 18 that is to be swaged by the swage machine 38.

In any case, as described above, to facilitate securing a grab adapter modular sub-section 112 to a grab adapter base sub-section 110 and/or transferring axial force therebetween, the grab adapter base sub-section 110 may include a base alignment notch 128 on its inner surface 130 while the grab adapter modular sub-section 112 may include a modular alignment tab 132, which is implemented (e.g., sized and/or shaped) to be disposed within the base alignment notch 128, on its outer surface 134. Accordingly, securing a grab adapter modular sub-section 112 to a grab adapter base sub-section 110 may include inserting a modular alignment tab 132 on the grab adapter modular sub-section 112 into a base alignment notch 128 in the grab adapter base sub-section 110 (process block 194). In particular, in some embodiments, the grab adapter modular sub-section 112 may be secured to the grab adapter base sub-section 110 at least in part via friction between the modular alignment tab 132 and the base alignment notch 128 and/or magnetic attraction between the grab adapter modular sub-section 112 and the grab adapter base sub-section 110.

To facilitate improving securement of a grab adapter modular sub-section 112 to a grab adapter base sub-section 110, as described above, in some embodiments, the grab adapter modular sub-section 112 may additionally include a modular retainer protrusion 136 on its outer surface 134 while the grab adapter base sub-section 110 may additionally include a base retainer protrusion 138 on its inner surface 130. In particular, in such embodiments, the modular retainer protrusion 136 may be implemented (e.g., sized and/or shaped) to matingly interlock with a cavity 139 defined by the base retainer protrusion 138 while the base retainer protrusion 138 may matingly interlock with a cavity 137 defined by the modular retainer protrusion 136. Thus, in such embodiments, securing a grab adapter modular sub-section 112 to a grab adapter base sub-section 110 may include interlocking a modular retainer protrusion 136 on the grab adapter modular sub-section 112 with a base retainer protrusion 138 on the grab adapter base sub-section 110 (process block 196).

Additionally, as described above, to facilitate improving securement of a grab adapter modular sub-section 112 to a grab adapter base sub-section 110, in some embodiments, the grab adapter modular sub-section 112 may be secured to the grab adapter base sub-section 110 via one or more threaded fasteners 68, such as a bolt or a screw. To enable securement via a threaded fastener 68, a fastener opening 120 may be formed through the grab adapter modular sub-section 112 and another fastener opening 120, which can be aligned with the fastener opening 120 in grab adapter modular sub-section 112, may be formed in the grab adapter base sub-section 110. In other words, in such embodiments, securing a grab adapter modular sub-section 112 to a grab adapter base sub-section 110 may include securing a threaded fastener 68 in corresponding fastener openings 120 formed in the grab adapter modular sub-section 112 and the grab adapter base sub-section 110, thereby securing the threaded fastener 68 through the grab adapter modular sub-section 112 to the grab adapter base sub-section 110 (process block 198).

As described above, in some embodiments, a section 108 of a modular grab adapter 62 may include multiple modular sub-sections 112 concurrently secured to its base sub-section 110. In particular, in some such embodiments, an initial modular sub-section 112 may be secured to the base sub-section 110 followed by another modular sub-section 112 such that the other modular sub-section 112 covers the initial modular sub-section 112. In other words, in such embodiments, deploying a section 108 of a modular grab adapter 62 in a swage machine 38 may generally include securing another grab adapter modular sub-section 112 to its base sub-section over an initial grab adapter modular sub-section 112 (process block 188). Accordingly, in some such embodiments, the other grab adapter modular sub-section 112 may engage a grab notch 66 on a pipe fitting 18 instead of the initial grab adapter modular sub-section 112 and, thus, the other grab adapter modular sub-section 112 that is actually secured to the grab adapter base sub-section 110 may be selected based on the geometry of the grab notch 66.

To facilitate securing another grab adapter modular sub-section 112 over an initial grab adapter modular sub-section 112 and/or transferring axial force therebetween, as described above, the other grab adapter modular sub-section 112 may include an adapter grab notch 150, which is implemented (e.g., sized and/or shaped) to enable the grab tab section 126 on the initial grab adapter modular sub-section 112 to be disposed therein, on its outer surface 134. Accordingly, securing another grab adapter modular sub-section 112 to a grab adapter base sub-section 110 over an initial grab adapter modular sub-section 112 may include disposing the grab tab section 126 on the initial grab adapter modular sub-section 112 within the adapter grab notch 150 in the other grab adapter modular sub-section 112 (process block 200). In particular, in some embodiments, the other grab adapter modular sub-section 112 may be secured to the initial grab adapter modular sub-section 112 and, thus, the grab adapter base sub-section 110 via friction between the grab tab section 126 on the initial grab adapter modular sub-section 112 and the adapter grab notch 150 in the other grab adapter modular sub-section 112 and/or magnetic attraction between the other grab adapter modular sub-section 112 and the initial grab adapter modular sub-section 112.

To facilitate improving its securement, as described above, in some embodiments, the other grab adapter modular sub-section 112 may be secured to the grab adapter base sub-section 110 via one or more threaded fasteners 68, such as a bolt or a screw. To enable securement via a threaded fastener 68, a fastener opening 120 may be formed in the grab adapter base sub-section 110 and another fastener opening 120, which can be aligned with the fastener opening 120 in grab adapter base sub-section 110, may be formed through the other grab adapter modular sub-section 112. In other words, in such embodiments, securing the other grab adapter modular sub-section 112 to the grab adapter base sub-section 110 may include securing a threaded fastener 68 in corresponding fastener openings 120 formed in the other grab adapter modular sub-section 112 and the grab adapter base sub-section 110, thereby securing the threaded fastener 68 through the other grab adapter modular sub-section 112 to the grab adapter base sub-section 110 (process block 202). In any case, in this manner, sections 108 of a modular grab adapter 62 may be implemented and/or deployed to enable a swage machine 38 to accommodate multiple different grab tab geometries, which, at least in some instances, may facilitate improving pipeline deployment efficiency, for example, by enabling the same swage machine 38 to be used with a variety of pipe fittings 18.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A swage machine, comprising:
   a die plate configured to enable a die that is to be used to conformally deform a portion of a pipe fitting around pipe segment tubing to be loaded in the swage machine;
   a grab plate having a plurality of grab plate sections that are pivotably connected via hinges; and
   a plurality of grab adapter sections, wherein each grab adapter section in the plurality of grab adapter sections comprises:
      a base sub-section connected to a corresponding grab plate section in the plurality of grab plate sections, wherein an inner surface of the base sub-section comprises an alignment notch; and
      a modular sub-section configured to be secured to the base sub-section, wherein:
         an outer surface of the modular sub-section comprises an alignment tab configured to be disposed within the alignment notch in the base sub-section; and
         an inner surface of the modular sub-section comprises a grab tab section configured to matingly interlock with a fitting grab notch on the pipe fitting to facilitate securing the swage machine to the pipe fitting.

2. The swage machine of claim 1, wherein:
   the die plate is configured to enable another die that is to be used to conformally deform another portion of another pipe fitting around other pipe segment tubing to be loaded in the swage machine;
   the modular sub-section in each of the plurality of grab adapter sections is configured to be secured to the base sub-section when the swage machine is to be used to conformally deform the portion of the pipe fitting around the pipe segment tubing; and
   each grab adapter section in the plurality of grab adapter sections comprises another modular sub-section configured to be secured to the base sub-section when the swage machine is to be used to conformally deform the other portion of the other pipe fitting around the other pipe segment tubing, wherein another inner surface of the other modular sub-section comprises another grab tab section configured to matingly interlock with another fitting grab notch on the other pipe fitting to facilitate securing the swage machine to the other pipe fitting.

3. The swage machine of claim 2, wherein another outer surface of the other modular sub-section in each of the plurality of grab adapter sections comprises another alignment tab configured to be disposed within the alignment notch in the base sub-section.

4. The swage machine of claim 2, wherein:
   the other modular sub-section in each of the plurality of grab adapter sections is configured to be secured to the base sub-section over the modular sub-section when the swage machine is to be used to conformally deform the other portion of the other pipe fitting around the other pipe segment tubing; and
   another outer surface of the other modular sub-section in each of the plurality of grab adapter sections comprises an adapter grab notch, wherein the grab tab section on the modular sub-section is configured to be disposed within the adapter grab notch in the other modular sub-section.

5. The swage machine of claim 2, wherein:
   the fitting grab notch on the pipe fitting has a smaller diameter than the other grab notch on the other pipe fitting; and
   the grab tab section on the modular sub-section extends out from the base sub-section farther than the other grab tab section on the other modular sub-section.

6. The swage machine of claim 1, comprising a plurality of threaded fasteners, wherein:

the base sub-section in each of the plurality of grab adapter sections comprises a first fastener opening;

the modular sub-section in each of the plurality of grab adapter sections comprises a second fastener opening configured to be aligned with the first fastener opening in the base sub-section; and each threaded fastener in the plurality of threaded fasteners is configured to be secured in the first fastener opening in a corresponding base sub-section and the second fastener opening in a corresponding modular sub-section to facilitate securing the corresponding modular sub-section to the corresponding base sub-section.

7. The swage machine of claim 6, wherein the first fastener opening in the base sub-section in each of the plurality of grab adapter sections and the second fastener opening in the modular sub-section in each of the plurality of grab adapter sections are formed in an axial direction.

8. The swage machine of claim 6, wherein the first fastener opening in the base sub-section in each of the plurality of grab adapter sections and the second fastener opening in the modular sub-section in each of the plurality of grab adapter sections are formed in a radial direction.

9. The swage machine of claim 6, comprising another plurality of threaded fasteners, wherein:

each grab plate section in the plurality of grab plate sections comprises a third fastener opening;

the base sub-section in each of the plurality of grab adapter sections comprises a fourth fastener opening configured to be aligned with the third fastener opening in a grab plate section in the plurality of grab plate sections; and each threaded fastener in the other plurality of threaded fasteners is configured to be secured in the fourth fastener opening in a corresponding base sub-section and the fourth fastener opening in a corresponding grab plate section to facilitate securing the corresponding base sub-section to the corresponding grab plate section.

10. The swage machine of claim 1, wherein:

the base sub-section in each of the plurality of grab plate sections comprises a base retainer protrusion on the inner surface of the base sub-section; and the modular sub-section in each of the plurality of grab plate sections comprises a modular retainer protrusion on the outer surface of the modular sub-section, wherein the modular retainer protrusion is configured to matingly interlock with the base retainer protrusion to facilitate securing the modular sub-section to the base sub-section.

* * * * *